(12) United States Patent
Adachi et al.

(10) Patent No.: US 8,465,168 B2
(45) Date of Patent: Jun. 18, 2013

(54) LIGHTING UNIT AND DISPLAY PROVIDED WITH THE SAME

(75) Inventors: Masaya Adachi, Hitachi (JP); Makoto Tsumura, Hitachi (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 193 days.

(21) Appl. No.: 13/033,090

(22) Filed: Feb. 23, 2011

(65) Prior Publication Data

US 2012/0008308 A1 Jan. 12, 2012

(30) Foreign Application Priority Data

Jul. 9, 2010 (JP) .................................. 2010-156304

(51) Int. Cl.
*G02F 1/13357* (2006.01)

(52) U.S. Cl.
USPC ........................................ 362/97.2; 362/625

(58) Field of Classification Search
USPC ............. 362/27, 29, 223, 218, 628, 624, 625, 362/601, 606–607, 612–613, 615; 349/62, 349/65
See application file for complete search history.

(56) References Cited

U.S. PATENT DOCUMENTS

| | | | |
|---|---|---|---|
| 4,542,449 A | 9/1985 | Whitehead | |
| 6,561,663 B2 | 5/2003 | Adachi et al. | |
| 6,871,975 B2 | 3/2005 | Chuang | |
| 6,874,900 B2 * | 4/2005 | Hsieh | 362/26 |
| 7,460,103 B2 | 12/2008 | Konno et al. | |
| 7,572,045 B2 | 8/2009 | Hoelen et al. | |
| 7,905,640 B2 | 3/2011 | Gergets et al. | |
| 7,905,646 B2 | 3/2011 | Adachi et al. | |
| 2002/0024803 A1 | 2/2002 | Adachi et al. | |
| 2004/0105247 A1 * | 6/2004 | Calvin et al. | 362/31 |
| 2004/0218388 A1 * | 11/2004 | Suzuki | 362/231 |
| 2005/0122707 A1 * | 6/2005 | Kim | 362/29 |
| 2005/0184952 A1 | 8/2005 | Konno et al. | |
| 2008/0165307 A1 | 7/2008 | Adachi et al. | |
| 2010/0002169 A1 | 1/2010 | Kuramitsu et al. | |

FOREIGN PATENT DOCUMENTS

| | | |
|---|---|---|
| JP | 1-37801 | 8/1989 |
| JP | 2004-146360 | 5/2004 |
| JP | 2004-302067 | 10/2004 |
| JP | 2005-524194 | 8/2005 |
| JP | 2005258403 | 9/2005 |
| JP | 4023079 | 12/2007 |
| JP | 2008-27740 | 2/2008 |

(Continued)

*Primary Examiner* — Anh Mai
*Assistant Examiner* — Elmito Breval
(74) *Attorney, Agent, or Firm* — Antonelli, Terry, Stout & Kraus, LLP.

(57) ABSTRACT

This lighting unit can control luminance in a plurality of block areas independently, and minimize luminance unevenness caused by discretely arrayed light sources, with a reduced number of parts. The lighting unit comprises: a light guide plate having a first and a second grooves formed therein; a first light source group accommodated in the first groove; and a second light source group accommodated in the second groove; the light guide plate having a first light mixing area, a first light emitting area and a second light mixing area; in the first light mixing area, the thickness of the light guide plate progressively increasing away from the first light source group; in the second light mixing area, the thickness of the light guide plate progressively increasing away from the second light source group; and in the first light emitting area, the light guide plate being flat-plate-like.

17 Claims, 11 Drawing Sheets

FOREIGN PATENT DOCUMENTS

| | | |
|---|---|---|
| JP | 2008-171590 | 7/2008 |
| JP | 2008-262766 | 10/2008 |
| JP | 4262368 | 5/2009 |
| JP | 2010-140913 | 6/2010 |

\* cited by examiner

LIGHTING UNIT AND DISPLAY PROVIDED WITH THE SAME

INCORPORATION BY REFERENCE

The present application claims priority from Japanese application JP2010-156304 filed on Jul. 9, 2010, the content of which is hereby incorporated by reference into this application.

BACKGROUND OF THE INVENTION

The present invention relates to a lighting unit and a display having the same.

Displays are media used to visually convey information to humans and play important roles today for humans and the highly sophisticated information society. Displays are classified largely into light emitting type displays, such as CRTs (cathode ray tubes) and PDPs (plasma display panels), and non-light emitting type displays, such as LCDs (liquid crystal displays), ECDs (electrochromic displays) and EPIDs (electrophoretic image displays).

The non-light emitting type displays form an image by adjusting the quantity of light transmission (or light reflection). Of this type of displays, the liquid crystal display in particular has achieved remarkable performance improvements in recent years and has been adopted increasingly as a display from cell phones to personal computers to large-screen television sets.

The liquid crystal display generally comprises a liquid crystal display panel that forms an image by controlling the amount of light passing therethrough or being reflected thereby, and a lighting unit disposed at the back of the liquid crystal panel to throw light onto the panel.

The lighting unit has some lighting schemes—an edge lit scheme (light guide plate scheme), a direct backlight scheme (reflection scheme) and a flat light source scheme. Especially to realize a thin lighting unit, the edge lighting scheme is employed. The edge lighting scheme has a light source arranged at the edge portion of a light guide plate and, as a major light source, a cold cathode fluorescent lamp is conventionally used. In recent years, however, light emitting diodes (LEDs) are being used as a light source of the lighting unit in small liquid crystal displays such as cell phones. Further, because of its advantages of not requiring an inverter necessary for the conventional cold cathode fluorescent lamps, and of being able to reduce environmental burdens, the LEDs as a light source free of mercury have come to be used increasingly in large-screen liquid crystal displays.

In the self-light emitting type displays such as PDPs, when an image is displayed, particular pixels are selectively driven to produce required volumes of light according to image signals. So, displaying black or dark image is achieved by stopping the emission of light or reducing the amount of light produced in the associated pixels, which contributes to a reduction in power consumption. Since in displaying black the associated pixels do not emit light, the contrast ratio in a dark room can be set to higher than several tens of thousands.

In the non-light emitting displays such as general liquid crystal displays, on the contrary, the backlight is made to emit light at a constant brightness level regardless of image signals. So, the backlight normally has its brightness matched to the conditions that produce the maximum luminance on the screen and maintains the same brightness even when black or dark images are displayed, resulting in a wasteful consumption of power that does not contribute to the image being displayed. Further, when black is displayed, the light leaking from the backlight prevents the image from becoming sufficiently dark, so that the contrast ratio in the dark room is smaller than that of the self-light emitting type displays such as PDPs.

There have been proposed liquid crystal displays that reduce power consumption and improve image quality by controlling the brightness (or luminance) of the backlight. JP-A-2005-258403, for example, discloses a technology that involves driving each of a plurality of divided block areas of a backlight, and controlling the brightness of each block area of the backlight according to an image signal, thereby reducing power consumption and improving image quality.

A variety of techniques have been proposed which control the luminance in each of a plurality of block areas of a backlight. For example, JP-B-4,262,368 discloses a lighting unit (backlight) which comprises a plurality of light guide plates each having a pair of opposing ends with different thicknesses and a plurality of light sources arranged close to the thicker of the pair of ends, different in thickness, of the light guide plates. JP-B-4,023,079 discloses a lighting unit which comprises a plurality of parallelly arranged linear light sources and a light guide plate having a plurality of grooves in which to accommodate these light sources, with the light guide plate formed with an inclined surface that forms a curved line along which the light guide plate, when viewed in cross section, decreases in thickness away from the light source accommodating portions. As a further document describing a prior art related with this invention, JP-B-01-037801 is cited.

SUMMARY OF THE INVENTION

With a lighting unit which has the light sources and the light guide plates arranged in a one-to-one relationship and which emits light only from the light guide plate whose light source is turned on, the luminance adjustment can be made in each block area. This system, however, has problems that because a plurality of light guide plates are required, the number of parts used becomes large and that since a plurality of light guide plates are arrayed and the light sources are put close to the corresponding light guide plates, the assembly becomes burdensome, increasing the manufacturing cost. The lighting unit having a plurality of parallelly arranged linear light sources and a plurality of grooves in which to accommodate these light sources has only one light guide plate and the number of parts is small, rendering the assembly easy, which in turn makes this lighting unit advantageous in terms of the manufacturing cost. However, it has a problem that if the optical efficiency of the light sources is improved in the future and the number of light sources becomes smaller, it will be difficult to restrain luminance unevenness caused by the discrete arrangement of light sources.

The present invention has been accomplished to overcome these problems experienced with the conventional technologies, and its objective is to minimize luminance unevenness caused by the discrete arrangement of light sources with the use of a small number of parts in a lighting unit capable of controlling the luminance in each of a plurality of block areas. Other problems and novel features of this invention will be made clear in the following descriptions with reference to the accompanying drawings.

To achieve the above objective, this invention employs the following features.

(1) A lighting unit comprising: a light guide plate having a first groove and a second groove formed therein; a first light source group accommodated in the first groove; and a second light source group accommodated in the second groove; wherein the light guide plate has a first light mixing area, a first light emitting area and a second light mixing area in that order from the first groove toward the second groove; wherein, in the first light mixing area, the thickness of the light guide plate progressively increases away from the first light source group; and wherein, in the second light mixing area, the thickness of the light guide plate progressively increases away from the second light source group; wherein, in the first light emitting area, the light guide plate is flat-plate-like.

(2) A lighting unit according to (1), wherein a light reflector is provided at ends of the light guide plate; wherein the light guide plate has a second light emitting area and a third light mixing area in that order from the ends of the light guide plate toward the first groove; wherein, in the third light mixing area, the thickness of the light guide plate progressively increases away from the first light source group; and wherein, in the second light emitting area, the light guide plate is flat-plate-like.

(3) A lighting unit according to (1), wherein, in the first light mixing area, the light guide plate propagates light from the first light source group and causes light from the second light source group to leave the light guide plate from a front side thereof; wherein, in the second light mixing area, the light guide plate propagates the light from the second light source group and causes the light from the first light source group to leave the light guide plate from the front side thereof; and wherein, in the first light emitting area, the light guide plate causes the light from the first light source group and from the second light source group to leave the light guide plate from the front side thereof.

(4) A lighting unit according to (1), wherein the first light mixing area satisfies a relation L01<L02 where L01 is a quantity of light per block area of a front surface of the light guide plate, the light leaving the front side after being emitted from the first light source group and L02 is a quantity of light per block area of the front surface of the light guide plate, the light leaving the front side after being emitted from the second light source group.

(5) A lighting unit according to (1), wherein, in the first light mixing area and the second light mixing area, the cross section of the light guide plate is tapered; wherein the cross section of the light guide plate in the first light mixing area and the cross section of the light guide plate in the second light mixing area are symmetrical with respect to a center line equidistant from the first groove and the second groove; and wherein the cross sections of the light guide plate in the first light mixing area and in the second light mixing area are continuously connected to the cross section of the light guide plate in the first light emitting area.

(6) A lighting unit according to (1), wherein, in the first light emitting area, a part of the light traveling from the first groove toward the second groove and a part of the light traveling from the second groove toward the first groove propagate and other parts of the light leave the light guide plate from a front side thereof.

(7) A lighting unit according to (1), wherein the first groove includes a first plane, a second plane, a third plane and a fourth plane; wherein the first plane and the fourth plane of the first groove are normal to a flat-plate-like plane of the light guide plate; and wherein the second plane and the third plane of the first groove are inclined to the flat-plate-like plane of the light guide plate.

(8) A lighting unit according to (1), wherein the first groove is defined by a first plane, a second plane, a third plane and a fourth plane; wherein a distance between the first plane and the fourth plane of the first groove progressively increases toward a front surface of the light guide plate; and wherein a distance between the second plane and the third plane of the first groove progressively decreases toward the front surface of the light guide plate.

(9) A lighting unit according to (1), wherein the first groove accommodates a third light source group and a heat sink; and wherein the first light source group is arranged on one side of the heat sink and the third light source group is arranged on the other side of the heat sink.

(10) A lighting unit according to (9), wherein a plurality of light sources making up the first light source group and a plurality of light sources making up the third light source group are staggered.

(11) A lighting unit according to (1), wherein the quantity of light emitted from the first light source group is greatest in a direction parallel to a flat-plate-like plane of the light guide plate.

(12) A lighting unit according to (1), wherein the quantity of light emitted from the first light source group is greatest in a direction inclined from a direction parallel to a flat-plate-like plane of the light guide plate toward a back side of the light guide plate.

(13) A lighting unit according to (1), wherein the light guide plate has a light path changing member on a front side thereof; and wherein the light path changing member changes directions of the light leaving the light guide plate from the front surface thereof.

(14) A lighting unit according to (13), wherein the light path changing member is a transparent sheet; wherein the light path changing member has a plurality of prism faces on a surface thereof; and wherein ridges of the prism faces are parallel to a direction in which a plurality of light sources making up the first light source group are arrayed.

(15) A lighting unit according to (1), wherein, in the first light mixing area and the second light mixing area of the light guide plate, a surface roughness Ra of a back surface of the light guide plate is greater than 0 nm and equal to or smaller than 38 nm.

(16) A lighting unit according to (1), wherein a length Lm of the light guide plate in the first light mixing area satisfies an equation (1):

$$Lm \geq p/2 \tan \zeta 2 \geq p/2 \tan(\sin^{-1}(n1/n2 \cdot \sin \zeta 1)) \qquad (1)$$

where p is a pitch at which a plurality of light sources making up the first light source group are arrayed, $\zeta 1$ is a half-value angle of an incident light emitted from the plurality of light sources into the light guide plate, and $\zeta 2$ is an angle at which the incident light on the light guide plate travels through the light guide plate, n1 is a refractive index of a medium between the light guide plate and the plurality of light sources, and n2 is a refractive index of the light guide plate.

(17) A lighting unit according to (1), wherein, after being emitted from the first light source group, the light leaving the first light emitting area of the light guide plate from a front side thereof are greater in quantity than the light leaving the first light mixing area of the light guide plate from the front side thereof; and wherein, after being emitted from the second light source group, the light leaving the first light emitting area of the light guide plate from the front side thereof is greater in quantity than the light leaving the second light mixing area of the light guide plate from the front side thereof.

(18) A display comprising: a display panel to display an image by adjusting the quantity of light that is allowed to pass therethrough; and the lighting unit of (1) to illuminate the display panel from behind it; wherein an array direction of a plurality of light sources making up the first light source group is aligned with a longitudinal direction of a screen of the display panel.

According to this invention, a lighting unit is realized which is able to control luminance in each of a plurality of block areas and minimize luminance unevenness, that would otherwise be caused by a plurality of discretely arrayed light sources, and which also has a reduced number of parts. A display using the lighting unit of this invention is high in luminance uniformity on the screen and has a slim bezel and a small thickness. Problems, constructions and advantages of this invention other than those described above will become apparent from the following descriptions of embodiments.

DESCRIPTION OF THE EMBODIMENTS

Figure 1:
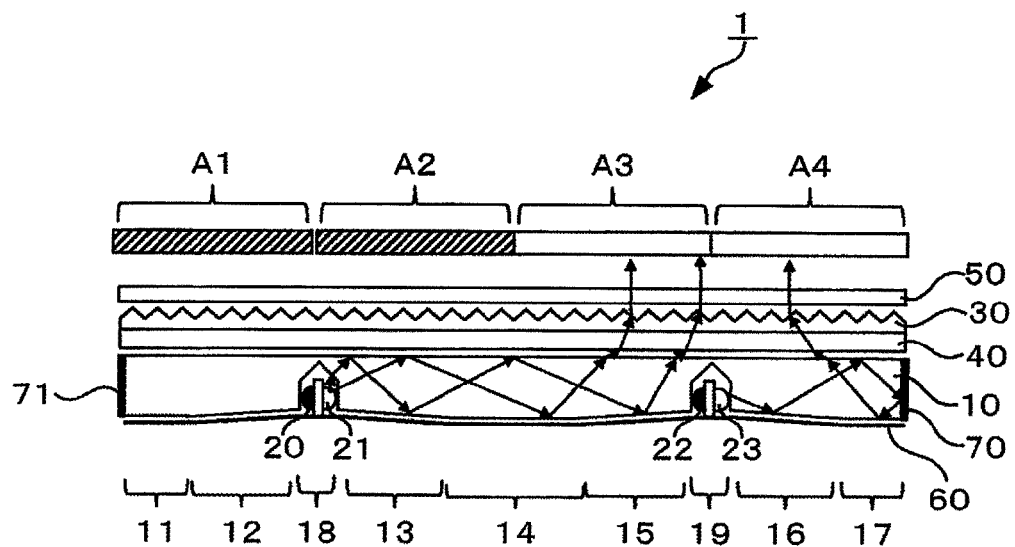
FIG. 1 is a schematic partial cross-sectional view showing construction of a lighting unit according to one embodiment of this invention.

Embodiments of this invention will be described in detail. It should be noted that various modifications may be made to what is described in the following and that any combination of the embodiments described below falls within the scope of this invention. Throughout all drawings referenced in the following descriptions of the embodiments, elements with identical functions are assigned the same reference numerals and their repetitive explanations are omitted.

(Embodiment 1 of Lighting Unit)

FIG. 1 is a schematic partial cross-sectioned view showing the structure of the essential portion of an example of the lighting unit of this invention. It is noted that, for ease of explanation, the accompanying drawings are not necessarily represented with correct scales.

The lighting unit 1 is suitably disposed at the back of a display panel not shown to illuminate the display panel from its back surface. The display panel may be used that displays an image by adjusting the amount of incident light passing therethrough, particularly a long lifed liquid crystal display panel capable of a matrix display.

The lighting unit 1 comprises a light guide plate 10, light source groups 20-23 having a plurality of light sources respectively installed in grooves formed in the light guide plate 10, a light reflector 60 provided at the back surface of the light guide plate 10, light reflectors 70 and 71 provided at the ends of the light guide plate 10, and an optical path changer 30 so arranged to cover an entire front surface of the light guide plate 10.

Although the optical path changer 30 itself may be provided with some stiffness, it may comprise a transparent plate or diffusion plate 40 which is installed between the light guide plate 10 and the optical path changer 30 and which has an enough stiffness to hold the optical path changer 30. Over the optical path changer 30 there may be provided a diffusion sheet 50, as required.

While the lighting unit 1 requires mechanical structures, such as a bezel, and electrical structures, such as a power supply and wiring for energizing the light sources, those portions not characteristic of this invention may employ commonly used means. So their detailed descriptions are not given.

The light source groups 20-23 may use a plurality of light sources that satisfy such conditions as small size, high optical efficiency and low heat generation. Desirable candidates for such light sources include light emitting diodes (LEDs). Among them a white light emitting diode can be used. The light emitting diode that realizes a white light may be a light emitting diode that emits a blue light and is combined with a phosphor that emits a yellow light when excited by the emitted blue light, or a light emitting diode that emits a blue or ultraviolet light and is combined with a phosphor which, when excited by the emitted light, produces intensity peaks at blue, green and red light wavelengths.

Alternatively, if a display having the lighting unit is to realize a display of colors by an additive color mixing, it is advised that light emitting diodes which emit three primary colors—red, blue and green—be used as a light emitting device. For example, when a color liquid crystal panel is used as a display panel, the use of light sources that have intensity peaks at wavelengths corresponding to transmission spectra of color filters of the liquid crystal panel can realize a display with a wide color gamut. Alternatively, if a display of colors is to be achieved by color-field-sequential, light emitting diodes that emit three primary colors—red, blue and green— may be used to achieve a display with little light loss and a wide color gamut because the liquid crystal panel requires no color filters, the cause of light loss.

Figure 2:
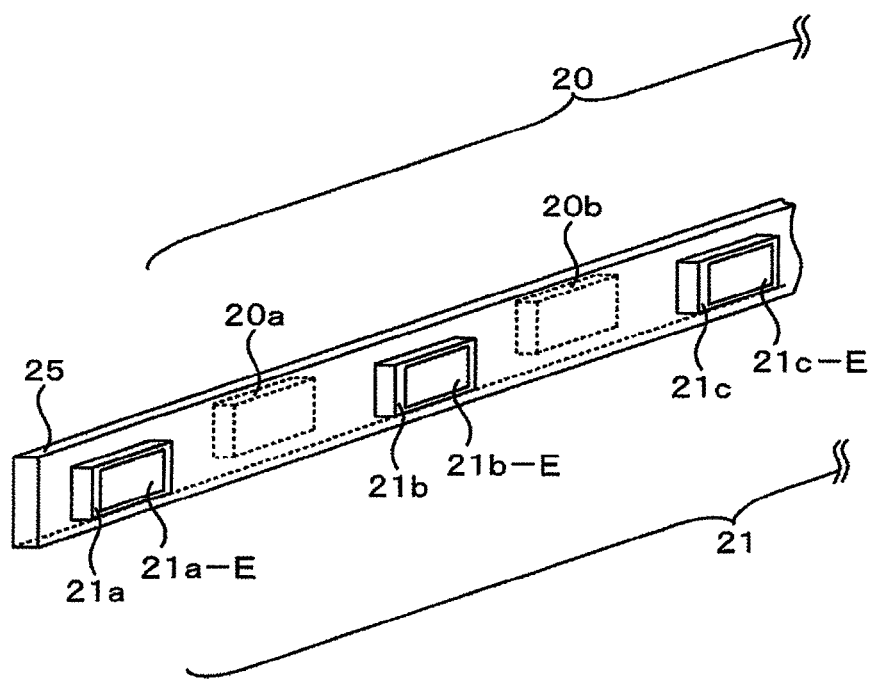
FIG. 2 is a schematic perspective view showing an example of light source groups used in the lighting unit according to one embodiment of this invention.

FIG. 2 is a schematic perspective view of an example of light source groups. The light source groups according to this invention can be implemented by arraying a plurality of light sources 20a, 20b, . . . and a plurality of light sources 21a, 21b, 21c, . . . in line or stripe on both sides of a long platelike heat sink 25. In FIG. 2, the light source group 20 is arranged on one side of the heat sink 25 and the light source group 21 on the other side of the heat sink 25. If a plurality of light sources are arranged in stripe, the lighting unit becomes thick. It is therefore desired that the light sources be arranged in line. The light source 21a, 21b, 21c, . . . , are preferably shaped such that a light emitting portion 21a-E, 21b-E, 21c-E, . . . , have a greater width in the light source array direction than in a direction perpendicular to the light source array direction for the purpose of minimizing luminance unevenness and reducing the thickness of the lighting unit.

Individual light sources are connected through wirings not shown to a DC power supply and a controller that controls them to be turned on or off. The wirings and light sources are formed on the heat sink 25 with an insulation layer therebetween not shown. The insulation layer may be made of high-polymer materials, such as epoxy resin, polyimide resin or acrylic resin. For an improved reflection of light coming from the light sources to the light guide plate 10, the surface of the insulation layer on which wirings and light emitting units are formed may be provided with a metal film such as silver and aluminum with high reflection factors; a light reflection film that contains in a transparent resin a mixture of fine particles or air bubbles with different refractive indices to achieve a white color reflection; or a light reflection surface formed of a dielectric multilayered film.

The light sources have their light emitting portions covered with a transparent resin. To direct the light from the light emitting portions toward the light guide plate 10 with a high efficiency, the transparent resin may be shaped like a convex lens or an artillery shell. The transparent resin needs only to be transparent to visible radiation light and may use an epoxy, silicone or acrylic resin. For example, the transparent silicone resin has excellent light and heat resistances and thus can be suitably used when the amount of light is large. The transparent epoxy resin, on the other hand, though it is not as good as the silicone resin in light and heat resistances, has an advantage of low cost.

It is desired that the heat sink 25 be formed of metals with high thermal conductance such as aluminum and copper, or materials with relatively high thermal conductance such as carbon or ceramics. This is because the typical light emitting diode degrades in its optical efficiency as the temperature rises.

Figure 3:
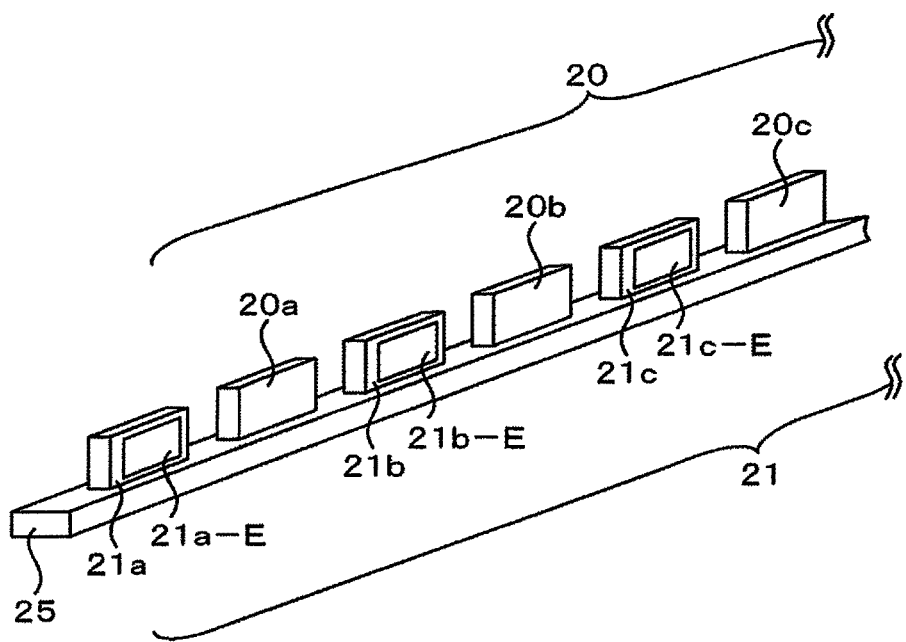
FIG. 3 is a schematic perspective view showing another example of the light source groups used in the lighting unit according to one embodiment of this invention.

The lighting unit of this invention may be constructed so that, as shown in FIG. 2, the light sources making up the light source group 20 and the light sources of the adjoining light source group 21 in the same groove of the light guide plate 10 are staggered. This staggered arrangement allows heat produced by the light emitting diodes (light sources) to be dispersed and dissipated efficiently, suppressing a temperature increase, which in turn offers an advantage of being able to prevent a possible reduction in the optical efficiency resulting from the temperature rise. The light source groups 20 and 21 may also be arranged as shown in FIG. 3. That is, the light sources 20a, 20b, 20c, . . . and the light sources 21a, 21b, 21c, . . . making up the different light source groups 20 and 21, respectively, may be alternated in a single line on the heat sink 25, with every light source of one group immediately followed by one of the light sources of the other group. This arrangement allows the adjacent light source groups to be installed in a smaller space.

Figure 4:
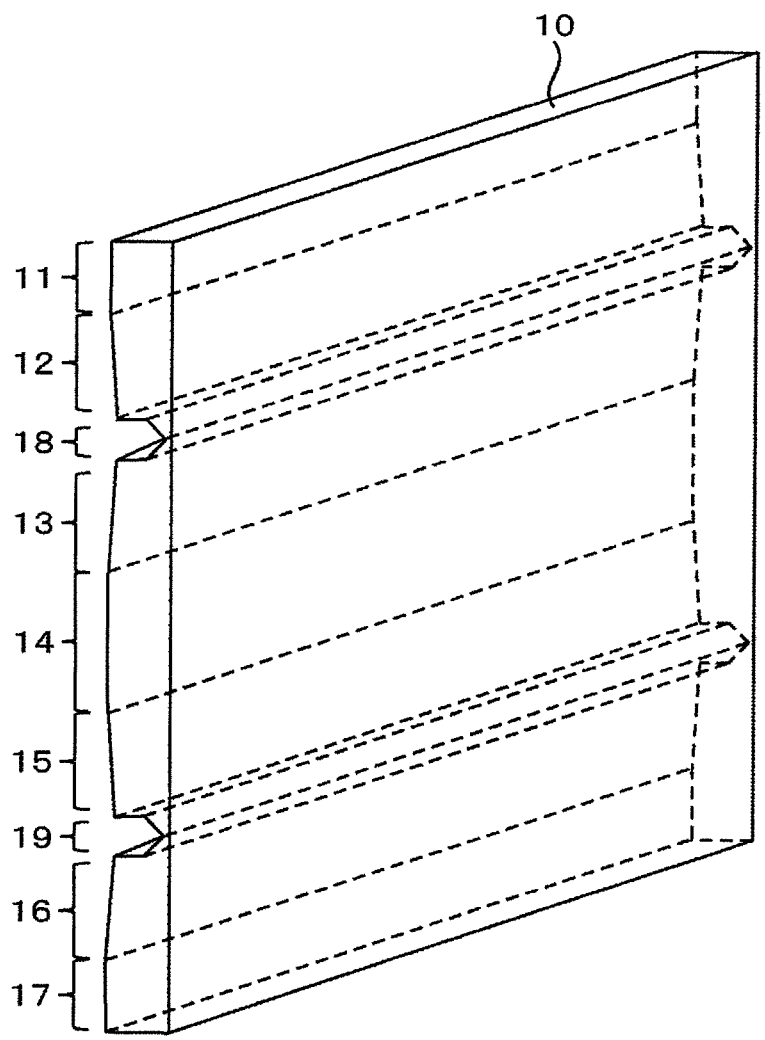
FIG. 4 is a schematic perspective view showing a light guide plate used in the lighting unit according to one embodiment of this invention.

FIG. 4 illustrates a light guide plate in a schematic perspective view as used in the lighting unit of this invention. The light guide plate 10 is constructed of a platelike member transparent to visible radiation light and has grooves in which to accommodate light source groups and at least two areas with different functions. More specifically, light mixing areas are provided adjoining the grooves and light emitting areas next to the light mixing areas.

In the following, a light guide plate 10 with two grooves is described. It is noted, however, that this invention is not limited to this and an optimal structure can be selected according to the size of an object to be illuminated and the required luminance level, etc.

The light guide plate 10 has a groove 18 (first groove), in which to accommodate a light source group 20 (third light source group) and a light source group 21 (first light source group), and a groove 19 (second groove), in which to accommodate a light source group 22 (second light source group) and a light source group 23 (fourth light source group).

There are a light mixing area 12 (third light mixing area) and a light mixing area 13 (first light mixing area) adjoining the groove 18, and a light mixing area 15 (second light mixing area) and a light mixing area 16 (third light mixing area) adjoining the groove 19. On the far side of the light mixing area 12 with respect to the groove 18, there is provided a light emitting area 11 (second light emitting area) and, on the far side of the light mixing area 16 with respect to the groove 19, a light emitting area 17 (second light emitting area). In an area sandwiched by the two light mixing areas between the two grooves, there is provided a light emitting area 14 (first light emitting area). From the groove 18 toward the groove 19 there are the first light mixing area 13, the light emitting area 14 and the light mixing area 15 in that order. And from the end of the light guide plate 10 where the light reflector 71 is provided toward the groove 18, the light emitting area 11 and the light mixing area 12 are arranged in that order.

Here, the light mixing area refers to an area in which, after being emitted from a plurality of light sources making up the light source groups into the light guide plate 10, light propagating away from the groove adjoining the light mixing area is allowed to be mixed together but almost kept from exiting from the front surface of the light guide plate 10 and in which light propagating towards the groove adjoining the light mixing area is allowed to exit from the front surface of the light guide plate 10. Further, the light emitting area refers to an area arranged to cause a part of light traveling through this area to leave the light guide plate 10 from its front surface. In more specific terms, the light emitting area 14 allows a part of light traveling therethrough from the groove 18 toward the groove 19 and a part of light traveling therethrough from the groove 19 toward the groove 18 to propagate but causes the remaining light to exit the light guide plate 10 from its front surface.

So, when we focus our attention on areas relating to the light source groups 20 and 21 for example, the light mixing areas 12 and 13 are areas where light emitted from a plurality of light sources making up the light source groups 20 and 21 accommodated in the groove 18 into the light guide plate 10, is mixed together. These areas are so constructed as to allow the light from the light source group 20 to travel through the light mixing area 12 (or light from the light source group 21 to travel through the light mixing area 13) and keep as much light as possible from leaving the light guide plate 10 from its front surface. The light mixing areas 12 and 13 are also arranged to cause light traveling toward the groove 18 to exit from the front surface of the light guide plate 10.

That is, the light mixing area 13 is constructed to cause the light emitted from the light source group 22 installed in the groove 19 into and propagating through the light guide plate 10 to exit from the front surface of the light guide plate 10.

The light mixing area 15 is constructed to allow the light travelling from the groove 19 to propagate therethrough without escaping from its front surface but cause the light propagating from the groove 18, i.e., the light emitted from the light source group 21 and traveling through the light guide plate 10, to exit from the front surface of the light guide plate 10.

Further, the light emitting area 14 is constructed to cause the light emitted from the light source groups 21 and 22 into the light guide plate 10 to exit from the front surface of the light guide plate 10. That is, the light emitting area 14 has a function of making the light from both of the light source groups leave the light guide plate 10 from its front surface.

Therefore, as for the light emitted from the light source group 21 close to the light mixing area 13, the amount of light leaving the light emitting area 14 from the front surface of the light guide plate 10 is greater than that leaving the light mixing area 13 from the front surface of the light guide plate 10. Further, as to the light emitted from the light source group 22 close to the light mixing area 15, the amount of light leaving the light emitting area 14 from the front surface of the light guide plate 10 is greater than that leaving the light mixing area 15 from the front surface of the light guide plate 10.

Figure 5:
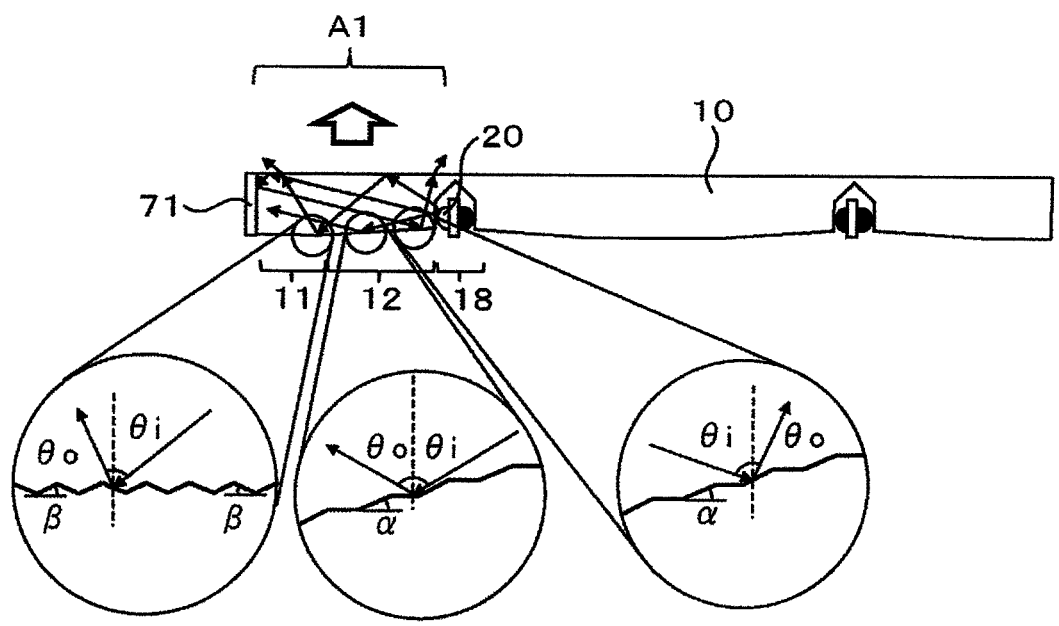
FIG. 5 is a schematic cross-sectional view showing one part of the light guide plate used in the lighting unit according to one embodiment of this invention.
Figure 6:
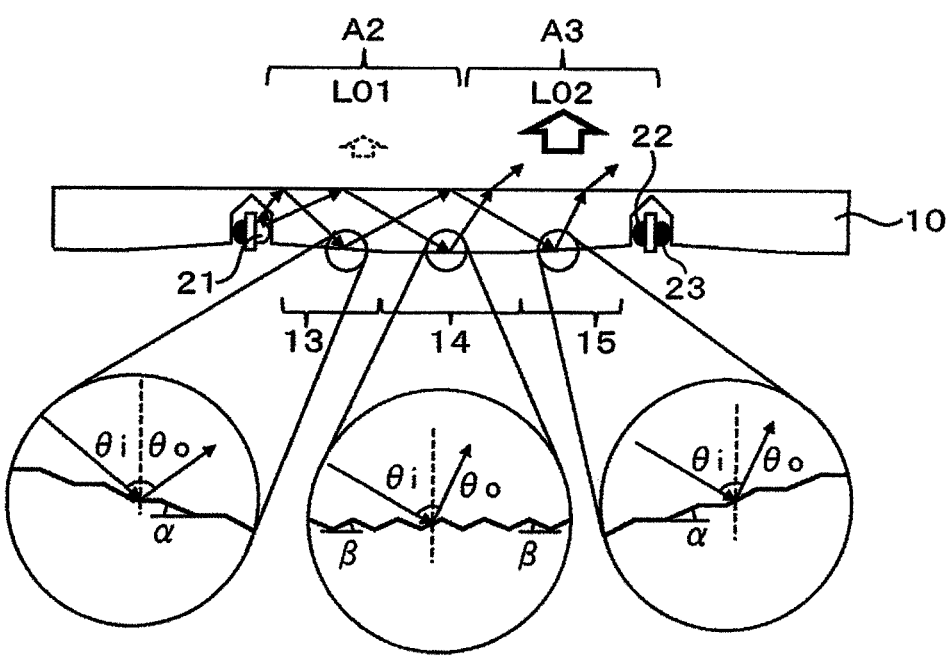
FIG. 6 is a schematic cross-sectional view showing another part of the light guide plate used in the lighting unit according to one embodiment of this invention.

A structure example to implement these functions are shown in FIG. 5 and FIG. 6. That is, the front surface of the light guide plate 10 is flat and almost parallel to the principal surface of an object to be illuminated. The light mixing areas 12 and 13 and the light mixing areas 15 and 16 of the light guide plate 10 are tapered, when seen macroscopically, such that they are made thin on the side of the light source groups 20, 21, 22 and 23 and, as they get farther away from the light source groups, their thickness progressively increases. The light emitting area 11 and the light emitting area 14 are flat-plate-like.

In other words, the light guide plate 10 of this invention, when seen macroscopically, comprises tapered areas, in which the light guide plate progressively increases its thickness as it gets farther away from the grooves (in the light mixing areas 12, 13, 15 and 16 the light guide plate 10 progressively increases its thickness as it gets farther away from the light source groups), and flat-plate-like areas connecting to the tapered areas.

The light guide plate 10 is formed at its back side with minute geometric shapes to cause light propagate through the light guide plate 10 to exit from its front side. As illustrated in FIG. 5 and FIG. 6, in the light mixing areas 12, 13, 15 and 16, the light guide plate 10 has its back surface so shaped that minute planes parallel to the front surface of the light guide plate 10 are alternated repetitively with minute planes inclined at such an angle α to cause the light guide plate 10 to progressively increase its thickness as it gets farther away from the adjoining grooves of the light guide plate 10. The size of these parallel minute planes and inclined minute planes and the angle α of the inclined minute planes need only to be determined so that uniform light is emitted from the front surface, and may be changed depending on the position. The realistic size and angle α of the minute plane are several μm to several tens μm and 1-45 degrees, respectively. With the back surface of the light guide plate shaped as described above, the light travelling away from the groove adjoining the light mixing area can be mixed together and be almost kept from leaving the light guide plate 10 from its front side. As for the light travelling towards the groove adjoining the light mixing area, they can be made to exit from the front side of the light guide plate 10.

In order to change propagation angles of light propagating through the light guide plate 10 and cause them to leave the light guide plate 10 from its front side in the light emitting areas 11 and 14, the back surface of the light guide plate 10 is formed with many minute concavities and convexities and steps inclined with respect to the front surface of the light guide plate or with alternated minute planes inclined in directions reverse to each other, as shown in the figure. The realistic size and inclination angle β to the front surface of the light guide plate are several μm to several tens μm and ±1-45 degrees, respectively. The back surface shaped as described above can achieve a function of making the light propagate away from both of the light source groups leave the light guide plate 10 from its front side.

Figure 7:
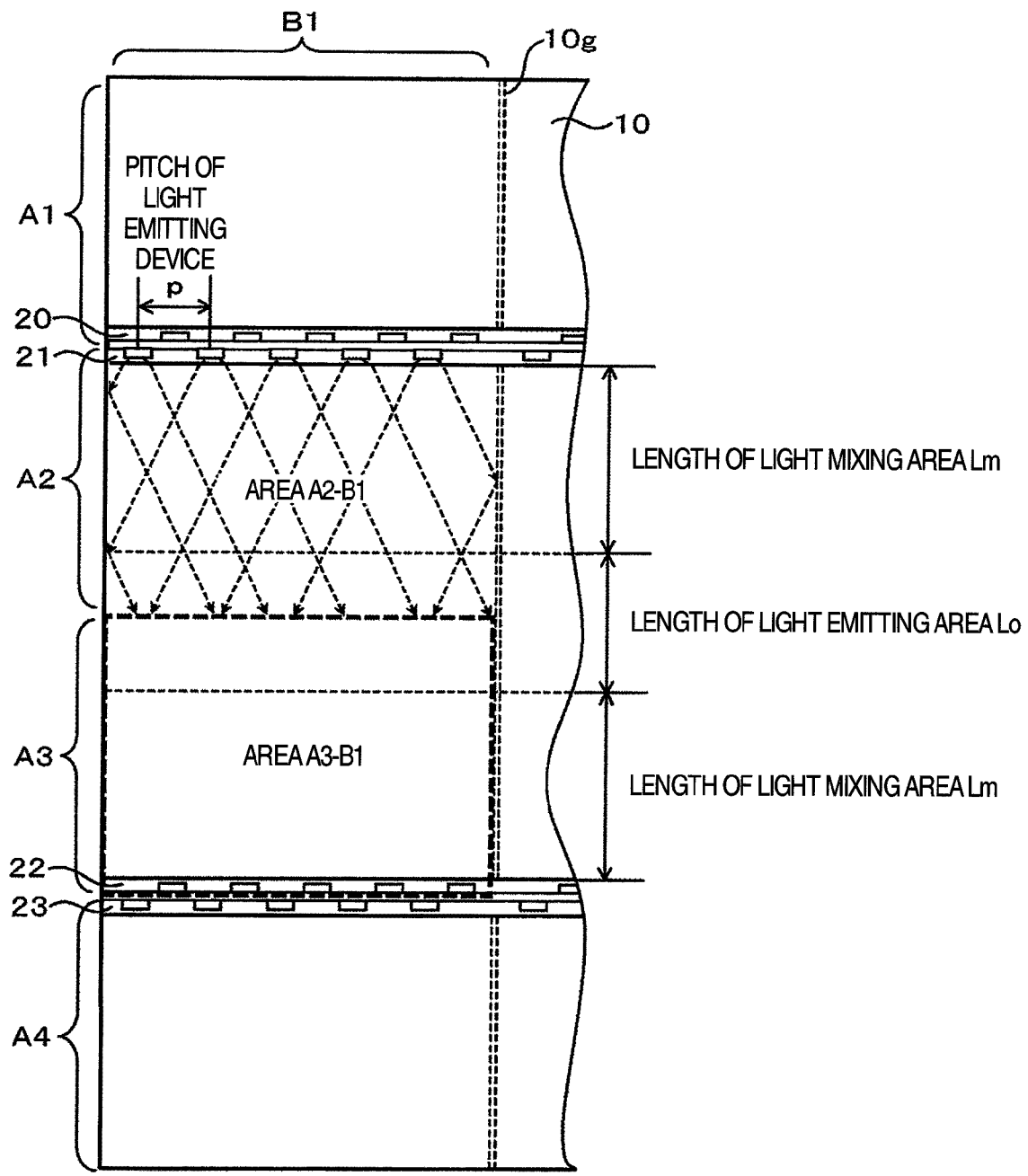
FIG. 7 is a schematic partial view showing construction of the lighting unit according to one embodiment of this invention.

Next, the size (length) of the light mixing areas will be explained. FIG. 7 is a partial plan view of the lighting unit of this invention. The light emitted from the light source group 21 into the light guide plate 10 is reflected by total reflection in the area A2-B1 and propagate until they leave the light guide plate 10 from the area A3-B1. To make the outgoing light uniform, the area A2-B1 and the area A3-B1 are set to have equal lengths A2 and A3. That is, the two areas have symmetric tapered cross sections with respect to a center line equidistant from the two grooves 18 and 19 (a boundary line between the area A2-B1 and the area A3-B1), with these tapered areas progressively increasing in thickness toward the center line. In FIG. 7, the cross section of the light guide plate in the light mixing area is connected continuously with the cross section of the light guide plate in the light emitting area. The light mixing area is an area where the light emitted from a plurality of light sources making up the light source group 21 into the light guide plate 10 is mixed together. So, it is desired that the length Lm of the light mixing area as measured from the end face of the light guide plate 10 be set as follows.

As illustrated in FIG. 7, let the pitch at which a plurality of light sources making up each of the light source groups 20 and 21 are arrayed be p. It is also assumed that a half value angle of an incident light when it is emitted from the light emitting device into the light guide plate 10 is represented by $\zeta 1$, an angle at which this incident light on the light guide plate 10 travels through the light guide plate 10 is represented by $\zeta 2$, a refractive index of a medium between the light guide plate 10 and the light source is represented by n1, and a refractive index of the light guide plate 10 is represented by n2. Then, it is desired that the length Lm of the light mixing area as measured from the end face of the groove in the light guide plate 10 meets the condition expressed by the following equation. If a medium between a plurality of light sources and the light guide plate 10 is assumed to be air, n1=1.0.

$$Lm \geq p/2 \tan \zeta 2 \geq p/2 \tan(\sin^{-1}(n1/n2 \cdot \sin \zeta 1)) \quad (1)$$

This is the minimum required length to mix together light emitted from the adjoining light sources and to have the light intensity in the front direction of the light sources half. The light mixing area should preferably be equal to or longer than this length.

As illustrated in FIG. 7, a fine groove 10g may be provided, as required, to optically divide the light guide plate 10 into a plurality of separate areas in a longitudinal direction of the light source groups. Such a fine groove 10g is about several hundred μm to 3 mm wide and its depth may be set appropriately according to the thickness of the light guide plate 10. The fine groove 10g may be provided, as required, in either the back side or front side of the light guide plate 10 or both.

The resin material of the light guide plate 10 needs only to be transparent to visible radiation light. Such materials include acrylic resin, polycarbonate resin and amorphous olefin resin, which have been used for the conventional light guide plate of the edge lit scheme. For example, COP (cyclo olefin polymer) with a higher fluidity during molding than the acrylic resin may be used to effectively improve a yield in the molding process. Such a resin is available as Zeonor (product name) from Nippon Zeon. The COP has a lower absorbency than acrylic resin, so that, when used with a light guide plate that varies greatly in thickness as in this embodiment, it can effectively suppress the plate warping caused by the absorbency. Further, the COP is 20% lower in density than acrylic resin and thus has an advantage of being able to be made lighter.

There is an issue that needs consideration. If the surface roughness of the light guide plate 10 is high in the light mixing areas, the light entering from the adjacent grooves into the light guide plate 10 may get scattered as it propagates through the plate, resulting in a part of the scattered light leaving the light guide plate 10 from its front side. This in turn gives rise to a possibility that luminance differences in each area may not be able to be enhanced sufficiently. To deal with this problem, general optical parts are required to have a surface roughness Ra equal to or less than ⅟10 of the wavelength used. The wavelength used in the lighting unit of this invention is a visible wavelength (approximately 380-780 nm), so it is desired that the surface roughness Ra be set greater than 0 nm and equal to or smaller than 38 nm. Depending on the use, however, the surface roughness may be allowed to be greater.

On the back surface of the light guide plate 10, a light reflector 60 is provided. The light reflector 60 is intended to reflect light, which would otherwise leak out of the back side of the light guide plate, and turn them back into the plate for effective use. The light reflector 60 may be a reflection surface with a high reflection factor formed on a support member, such as a resin plate or a polymer film. The reflection surface may be made by forming on the support member a thin film of metal with a high reflection factor such as aluminum and silver, by an evaporating method and a sputtering method, by forming a dielectric multilayered film as a reflection enhancing film on the support member, or by coating a white pigment on the support member, etc. A plurality of transparent medium layers with different refractive indices may also be laminated to function as the light reflector 60. More specifically, the light reflector 60 may be a reflection sheet (product name Refstar from Mitsui Chemicals Inc.) having diffuse reflection layers laminated over the support film.

Figure 8:
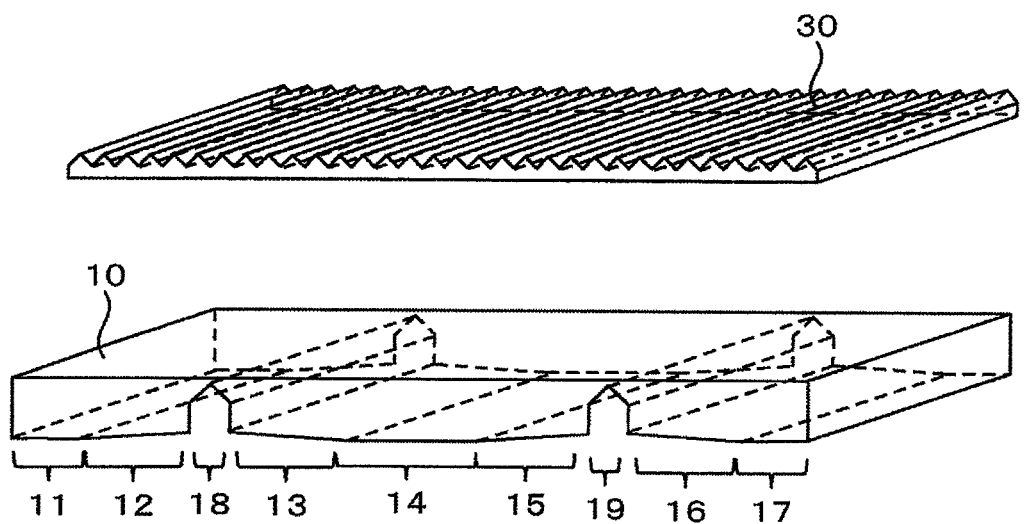
FIG. 8 is a schematic perspective view showing the light guide plate and a light path changing member used in the lighting unit according to one embodiment of this invention.

An optical path changer 30 (optical path changing member) is provided so as to cover the entire front surface of the light guide plate 10. FIG. 8 is a schematic perspective view illustrating a relationship between the light guide plate 10 and the optical path changer 30. The optical path changer 30 has a function of aligning the directions in which light exits from the light guide plate 10. More specifically, it aligns the propagation direction of light towards the front direction of the light guide plate as the light leaves the plate in directions at least perpendicular to the longitudinal direction of the light source groups 20-23.

As a means to implement such a function, a transparent sheet described in JP-B-01-037801 may be used which has its both sides formed with a smooth surface and a prism-shaped surface. Here, as illustrated in FIG. 1 and FIG. 8, we will describe an example of the optical path changer 30 which has a transparent sheet formed with a smooth surface on one side of the light guide plate 10 and a prism-shaped surface on the other side. Such a transparent sheet is marketed by 3M US as their products, RBEF, BEFIII and Wave Film, and suitably used as the optical changer of this invention. The optical path changer 30 has a plurality of prism faces forming the prism-shaped surface. The transparent sheet whose prisms have an average pitch of 50-100 μm and an angle of about 90 degrees is arranged as the optical path changer 30 so that the prism ridges (longitudinal direction) almost match the longitudinal direction of the light source groups. In other words, on the front side of the light guide plate 10 is placed such a transparent sheet that its prism ridges are aligned with the direction of the boundary line between the light mixing areas and the light emitting areas of the light guide plate and/or with the longitudinal direction of the grooves 18 and 19 of the light guide plate (array direction of a plurality of light sources making up each of the light source groups).

Between the optical path changer 30 and the light guide plate 10 there may be provided a transparent plate or diffusion plate 40 capable of supporting the optical path changer 30. Further, a diffusion sheet 50 may be provided over the optical path changer 30, as necessary.

The diffusion plate 40, interposed between the optical path changer 30 and the light guide plate 10, has a function of making uniform the distribution of angles at which light leaves the light guide plate 10 and the in-plane distribution of luminance. What can be used as the diffusion plate 40 includes: a transparent polymer film of, for example, PET (polyethylene terephthalate) and PC (polycarbonate) formed with undulations on its surface; a polymer film on whose surface a diffusion layer is formed by mixing, in a transparent medium, translucent fine particles of a different refractive index from that of the transparent medium; a plate or film having air bubbles mixed therein to provide diffuseness; and a milk white member having white pigments dispersed in a transparent member of acrylic resin.

The diffusion sheet 50 covering the front side of the optical path changer 30 is means to improve the uniformity of the distribution of angles at which light leaves the optical path changer 30 and also the uniformity of the in-plane distribution of luminance. Since the above transparent sheet, when used as the optical path changer 30, is easily scratched, the light diffusion sheet also serves as a protection layer for the optical path changer 30. Such a light diffusion sheet may be a transparent polymer film of, for example, PET and PC formed with undulations on its surface; a polymer film on whose surface a diffusion layer is formed by mixing, in a transparent medium, translucent fine particles of a different refractive index from that of the transparent medium; a plate or film having air bubbles mixed therein to provide diffuseness; and a milk white member having white pigments dispersed in a transparent member of acrylic resin.

At both ends of the light guide plate 10 there are provided light reflectors 70 and 71 (reflectors). They have a function to return the light which, after being emitted from the light source groups into the light guide plate 10, have reached the ends, into the plate again. For this purpose, the light reflectors 70 and 71 need to be able to reflect light with minimum losses but, in the case of those that perform scattered reflections, the ends of the light guide plate 10 and its neighborhood may become brighter giving rise to a problem of non-uniform distribution of luminance. So, the mirror reflectors are preferable.

The light reflectors 70 and 71 may be realized by bonding a support member such as a resin plate or a polymer film formed with a reflection surface of high reflection factor to the ends of the light guide plate with transparent bonding agents or adhesives, with its reflection surface directed toward the ends of the light guide plate. The reflection surface may be a metal film of high reflection factor such as aluminum and silver formed over a support member by an evaporating method and a sputtering method, or a dielectric multilayered film formed on the support member or a plurality of layers of transparent mediums (transparent films) with different refractive indices laminated over the support member to function as a reflection enhancing film.

Figure 9:
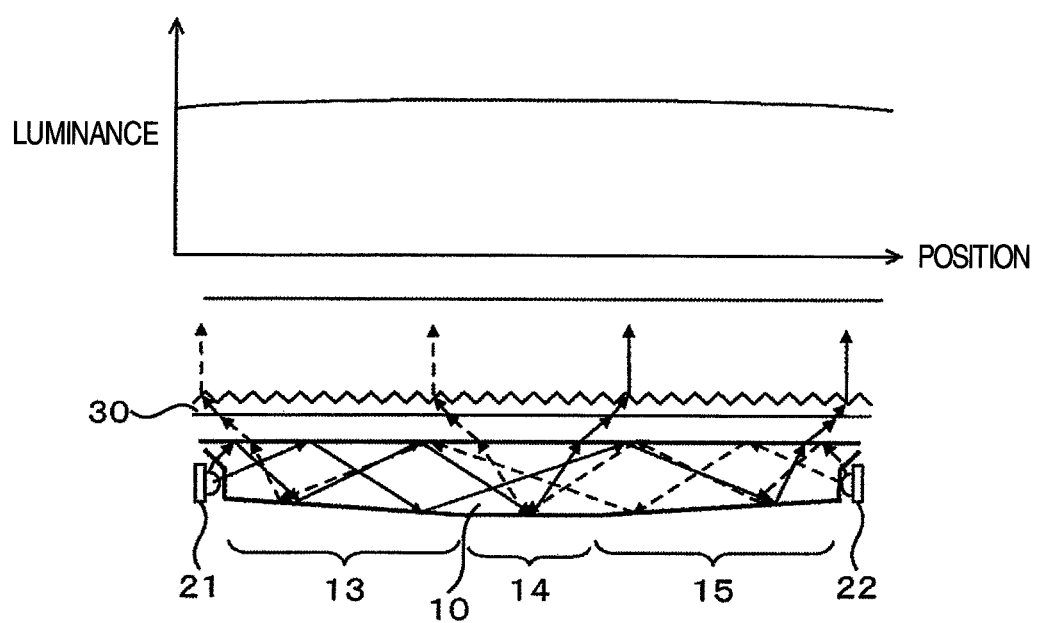
FIG. 9 is a schematic partial cross-sectional view showing construction of the lighting unit according to one embodiment of this invention, and a schematic diagram showing luminance levels depending on positions on the lighting unit.

Next, the operation of the lighting unit of this embodiment will be described by referring to FIG. 9 as well as the foregoing figures. First, let us consider a case where the light source group 21 and the light source group 22 are turned on. FIG. 9 is a schematic partial cross section of construction of the lighting unit of this invention and also shows luminance level depending on positions on the lighting unit.

Light emitted from a plurality of light sources making up the light source group 21 into the light guide plate 10 is mixed together in the light mixing area 13 as they propagate through the light guide plate. Here, an incidence angle θi and a reflection angle θo with respect to the back surface of the light guide plate are defined, with a line normal to the front surface of the light guide plate taken as a reference. For light traveling from the groove adjoining the light mixing area 13, θi≦θo, that is, the light hardly deviates from the range of required condition of the total reflection on the front surface of the light guide plate. Since in the light mixing area 13 almost no light from the light source group 21 leaves the light guide plate 10 from its front side, very little light that has not yet been mixed together well and become uniform after being emitted from the individual light sources, exits as is from its front side. A part of the light that has passed through the light mixing area 13 is then reflected in the light emitting area 14 by minute inclined planes formed at the back surface of the light guide plate 10. At this time, the relation between the incidence angle θi and the reflection angle θo is θi>θo, so that light incident on the front surface of the light guide plate 10 at angles not satisfying the condition of the total reflection, i.e., at angles equal to or smaller than the critical angle, exits from the front side of the light guide plate.

The light that has passed through the light emitting area 14 is reflected in the light mixing area 15 by inclined minute planes. At this time, the relation between the incidence angle θi and the reflection angle θo is θi>θo, so that light incident on the front surface of the light guide plate 10 at angles not satisfying the condition of the total reflection, i.e., at angles equal to or smaller than the critical angle, exits from the front side of the light guide plate 10.

As described above, most of the light emitted from the light source group 21 into the light guide plate 10 leaves the plate from the light emitting area 14 and the light mixing area 15 mostly in directions so inclined that the light leaves away from the light source group 21 (in the figure, in directions inclined toward right).

When the light leaving the light guide plate 10 enters into the optical path changer 30, propagation direction is changed so that all the light is aligned almost in a vertical direction with respect to the front surface of the light guide plate 10.

The light emitted from a plurality of light sources making up the light source group 22 into the light guide plate 10 is mixed together in the light mixing area 15 as it propagates through the light guide plate. At this time, the light from the light source group 22 that has not yet been mixed together well does not leave the plate in large quantities because the light mixing area 15 is so arranged as to keep most of the light from exiting from the front surface of the light guide plate. The light that has passed through the light mixing area 15 is reflected in the light emitting area 14 by the front surface and minute planes provided at the back surface of the light guide plate 10 as it travels through the light guide plate. At this time, after being reflected by the minute inclined planes on the back surface of the light guide plate 10, light incident on the front surface at angles not satisfying the condition of the total reflection, i.e., at angles equal to or smaller than the critical angle, exits from the front side of the light guide plate.

The light that has passed through the light emitting area 14 is reflected in the light mixing area 13 by minute inclined planes, leaving the light guide plate from its front side. As described above, most of the light emitted from the light source group 22 into the light guide plate 10 leaves the light guide plate 10 from the light emitting area 14 and the light mixing area 13 mostly in directions so inclined that it leaves away from the light source group 22 (in the figure, in directions inclined toward left).

When the light from the light guide plate 10 enters into the optical path changer 30, the propagation direction is changed so that all the light is aligned in a direction normal to the front surface of the light guide plate.

That is, the light emitted from the light source group 21 and the light emitted from the light source group 22 into the light guide plate 10 have different principal propagation directions when it leaves the light guide plate 10 from its front side. This poses a problem that, when the lighting unit is observed at a slant, the brightness level varies from one position to another unless their propagation directions are aligned. To deal with this problem, this invention provides the optical path changer 30 as a means for aligning the light in different propagation directions to a direction nearly normal to the front surface of the light guide plate.

When the aforementioned members are used for the optical path changer 30, the luminance of the front surface (at an exit angle of 0 degree) can be improved by about 1.3 times from when the optical path changer 30 is not used. That is, the use of the optical path changer 30 in the lighting unit of this invention offers an advantage of being able to eliminate luminance unevenness which would otherwise occur when the lighting unit is observed at a slant and to improve the luminance in the front direction.

The optical path changer 30 may be a transparent sheet having a prism-shaped surface on the side of the light guide plate and a smooth surface on the other side. In that case, since the principal propagation direction of the light leaving the light guide plate 10 varies depending on the position on the light guide plate 10, the apex angles of prisms making up the prism-shaped surface need only be changed depending on the position.

As described above, in the lighting unit of this invention, while the light emitted from a plurality of light sources making up a light source group adjoining a light mixing area into the light guide plate is under the mixing process in the light mixing area, the amount of light leaving the light guide plate from its front side is kept small. After having mixed together well and become uniform, the light is allowed to leave the light guide plate. This arrangement ensures the uniform illuminating light.

Figure 10:
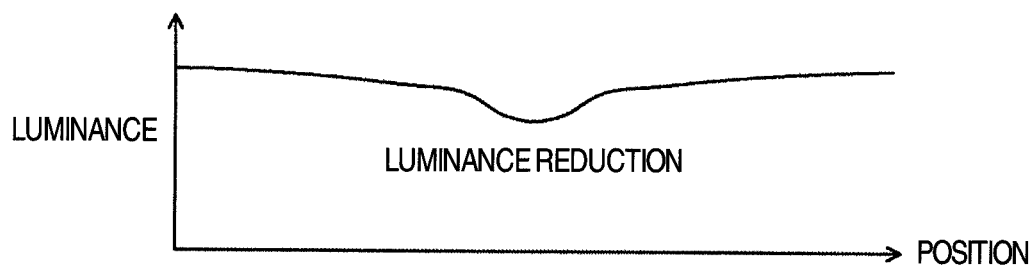
FIG. 10 is a schematic partial cross-sectional view showing construction of a lighting unit, and a schematic diagram showing luminance levels depending on positions on the lighting unit when a light emitting area is not provided in the light guide plate.
Figure 10:
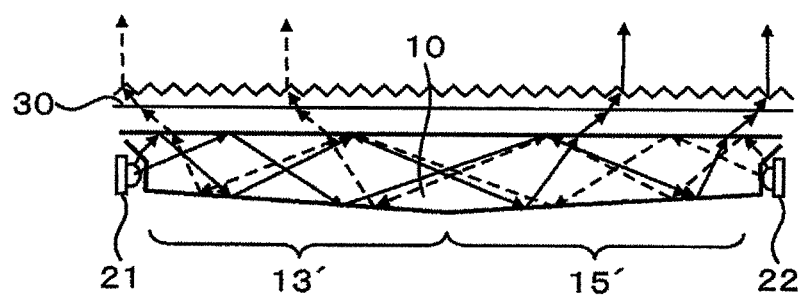

Next, the advantageous effects that the light emitting area in the lighting unit of this invention offers will be explained. FIG. 10 is a schematic partial cross section view showing construction of the lighting unit when the light emitting area is not provided next to the light mixing area (13' and 15' in the figure), and also shows luminance depending on positions on the lighting unit.

As described above, the light emitted from the light source group 21 and the light emitted from the light source group 22 into the light guide plate 10 have different principal propagation directions, when leaving the plate from its front side. That is, the light from the light source group 21, when leaving the light guide plate 10, has its principal propagation direction so tilted that it leaves away from the light source group 21 (in the figure, tilted toward right), whereas the light from the light source group 22, when leaving the light guide plate 10, has its principal propagation direction so tilted that it leaves away from the light source group 22 (in the figure, tilted toward left). Although the propagation directions of the light leaving the light guide plate 10 from its front surface are aligned by the optical path changer 30, since the light leaving the light mixing area 13' of the light guide plate 10 from its front surface and the light leaving the light mixing area 15' of the light guide plate 10 from its front surface propagate away from each other in their principal propagation direction, a problem arises that areas far from the grooves in the light guide plate 10 have a shortage of light quantity and therefore reduced luminance.

Further, if no light emitting areas are provided, the light mixing areas become large, raising the likelihood of the following two problems. The light mixing areas are so tapered that the cross-sectional thickness, when viewed macroscopically, progressively increases as it is more distanced from the groove (or light source group) adjoining the light mixing area. So, as the length of the light mixing areas increases, the thickness of the light guide plate also increases correspondingly, resulting in an increased size of the lighting unit. Further, in areas where the light guide plate is thick, there is a reduced probability of the light emitted from a light source group into the light guide plate reaching the back surface of the plate. This gives rise to another problem that the areas have a shortage of light quantity and a reduced luminance.

Our comprehensive study on these problems has found that the provision in the light guide plate of areas with different functions—a light mixing area and a light emitting area—can solve these problems. That is, the provision of the light emitting area 14 in the light guide plate 10 as described above (see FIG. 9) can produce a more uniform luminance distribution than when there is no light emitting area 14 (FIG. 10).

Further, the light guide plate 10 can be made thinner when the light emitting area 14 is provided than when it is not. Therefore, the provision of the light emitting area 14 in the lighting unit of this invention offers an advantage of being able to realize a lighting unit with an improved uniformity in the in-plane luminance distribution for the same thickness and also a lighting unit with a reduced thickness.

Next, the behaviors of light in an area close to the end of the light guide plate will be explained by referring to FIG. 5. Light emitted from a plurality of light sources making up the light source group 20 into the light guide plate 10 is mixed together in the light mixing area 12 as it propagates through the light guide plate. At this time, the relation between the incidence angle $\theta i$ and the reflection angle $\theta o$ with respect to the back surface of the light guide plate is $\theta i \leqq \theta o$ for the light traveling away from the groove adjoining the light mixing area 12, which means that the light hardly deviates from the range of required condition of the total reflection on the front surface of the light guide plate. So, in the light mixing area 12, almost no light from the light source group 20 leaves the light guide plate 10 from its front side, preventing most of the light that, after being emitted from individual light sources, has not yet been mixed together well and become uniform, from getting out of the light guide plate as is from its front side.

A part of the light that has passed through the light mixing area 12 is then reflected in the light emitting area 11 by minute inclined planes formed at the back surface of the light guide plate 10. At this time, the relation between the incidence angle $\theta i$ and the reflection angle $\theta o$ with respect to the back surface of the light guide plate is $\theta i > \theta o$, and the light incident on the front surface of the light guide plate 10 at angles not satisfying the condition of the total reflection, i.e., at angles equal to or smaller than the critical angle (of incident), exits from the front surface of the light guide plate 10.

Meanwhile, the light that has passed through the light emitting area 11 is reflected by the light reflector 71 back into the light emitting area 11. In the light emitting area 11, the relation between the incidence angle $\theta i$ and the reflection angle $\theta o$ of the light that is reflected by the minute inclined planes provided at the back surface of the light guide plate 10 is $\theta i > \theta o$, so that the light incident on the front surface of the light guide plate 10 at angles not satisfying the condition of the total reflection, i.e., at angles equal to or smaller than the critical angle, exits from the front surface of the light guide plate 10.

The light that has traveled past the light emitting area 11 enters again into the light mixing area 12. At this time, the relation between the incidence angle $\theta i$ and the reflection angle $\theta o$ of the light that is reflected by the minute inclined planes is $\theta i > \theta o$, so that the light incident on the front surface of the light guide plate 10 at angles not conforming to the condition of the total reflection, i.e., at angles equal to or smaller than the critical angle, exits from the front surface of the light guide plate 10.

As described above, after being emitted from the light source group 20 into the light guide plate 10, the light traveling in the light mixing area 12 away from the adjoining groove 18 hardly leaves the light guide plate 10 from the front side but the light traveling in the light mixing area 12 towards the adjoining groove 18 leaves the light guide plate 10 from the front side.

In the light emitting area 11, the light traveling away from the groove 18 and the light traveling towards it leave the light guide plate 10 from its front surface in different inclined directions. In particular, the principal propagation direction in which the light traveling in the light emitting area 11 away from the groove 18 leaves the front side of the light guide plate 10 differs from the principal propagation direction in which the light traveling in the light mixing area 12 towards the groove 18 leaves the front side of the light guide plate 10. This poses a problem that, unless the principal propagation directions are aligned, the lighting unit, when viewed at a slant, varies the brightness according to the position on its front surface. To solve this problem, this invention provides the optical path changer 30.

As described above, the optical path changer 30 is means to align the different propagation directions to a direction almost vertical to the front surface of the light guide plate and thereby minimize the position-dependent brightness unevenness when viewed at a slant, depending on the positions on the front surface of the light guide plate.

As for an area near the end of the light guide plate 10 as described above, very little light emitted from a plurality of light sources making up a light source group adjoining the light mixing area 12 into the light guide plate 10, leaves the front side of the light guide plate 10 while being mixed together in the light mixing area 12. After being mixed together well and become uniform, the light leaves the light guide plate 10 from an area near its end, so that the illuminating light highly uniform in luminance distribution can be produced.

Since there is no need to arrange light sources at the ends of the light guide plate 10, according to this invention as described above, a lighting unit with a reduced bezel can be realized.

Figure 11:
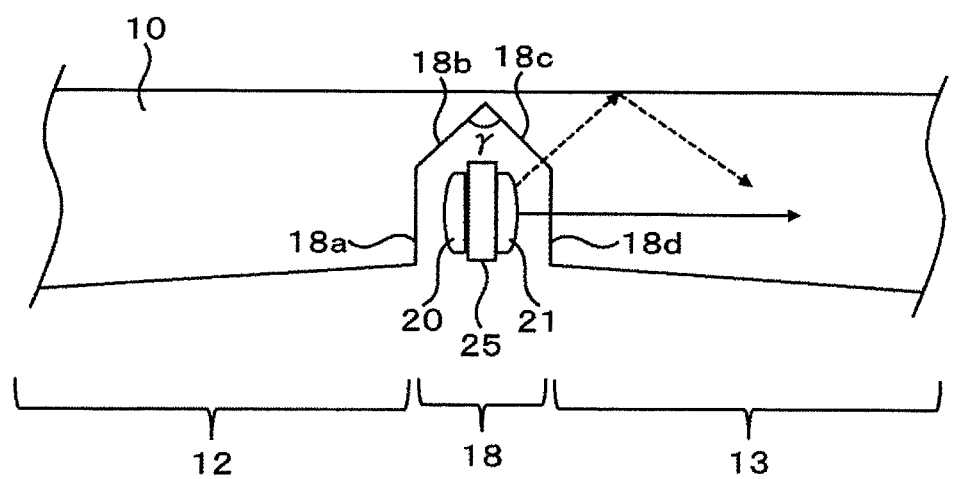
FIG. 11 is a schematic cross-sectional view showing a groove in the light guide plate of the lighting unit and neighborhood of the groove according to one embodiment of this invention.

Next, a cross-sectional shape of a groove in the light guide plate will be explained. FIG. 11 is a schematic cross section showing a groove in the light guide plate and light source groups in the groove. The groove 18 in the light guide plate 10 is defined by two planes 18a (first plane) and 18d (fourth plane) vertical to the principal plane of the object to be illuminated by the lighting unit, i.e., in this embodiment, the front plane (surface) of the light guide plate, and two planes 18b (second plane) and 18c (third plane) forming an apex angle γ. The planes defining the groove 18 may also include other planes than planes 18a-18d. The word "vertical" is not used in a strict mathematical sense of the word. The principal plane of the object to be illuminated is almost parallel to the flat-plate-like plane of the light guide plate. The reason that the groove has two planes forming the apex angle γ is that, after being emitted from light sources making up the light source group, the light traveling toward the front surface of the light guide plate 10 (indicated with a dashed line in the figure) can be prevented by the two planes from directly exiting from the front surface of the light guide plate, making the area close to where the light sources are installed brighter than other areas, and degrading the luminance uniformity.

The apex angle γ needs to be appropriately determined by considering the angle distribution of light emitted from the light sources. It is noted, however, that since a reduced apex angle γ requires a greater thickness of the light guide plate, the apex angle γ should preferably be chosen from a range of 40-90 degrees.

In this embodiment, the light sources making up a light source group should preferably be the ones that produce a maximum light quantity in a direction parallel to the principal plane of the object to be illuminated by the lighting unit, i.e., the principal front plane of the light guide plate. The word "parallel" is not used in a strict mathematical sense of the word. In this case, the light emitted from the light sources enters in a larger volume vertically through the planes 18a and 18d, that are perpendicular to the front surface of the light guide plate, than other planes of the groove. The reflection at a boundary surface between the light guide plate 10 and air decreases when light enters vertically into the boundary. So, the use of such light sources can minimize light losses incurred when it enters into the light guide plate 10. Further, the use of such light sources can also reduce the amount of light directly traveling towards the front side of the light guide plate, thus preventing areas close to where the light sources are installed from becoming brighter than other areas and degrading the luminance uniformity.

Figure 12:
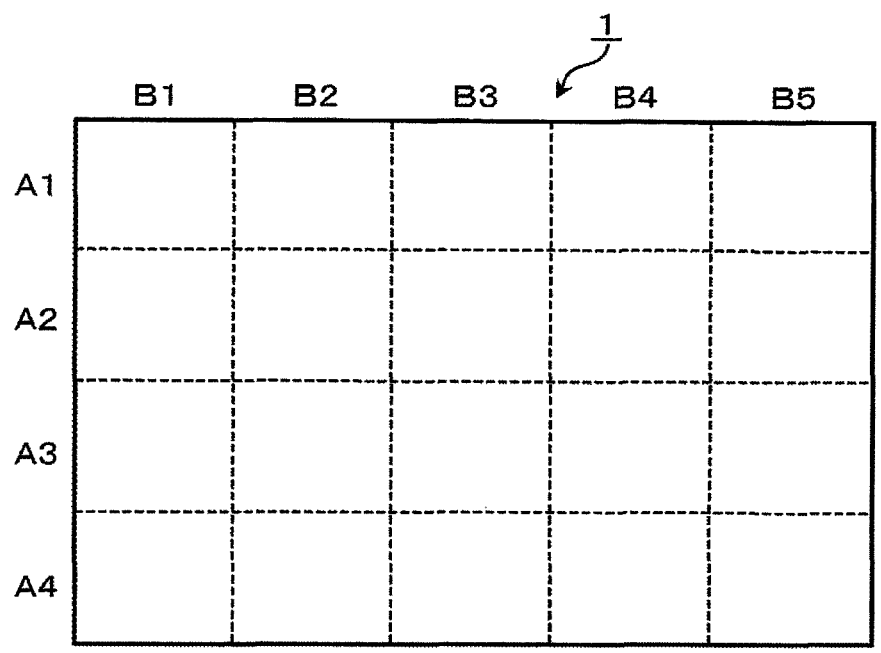
FIG. 12 is a front view showing construction of the lighting unit according to one embodiment of this invention.

FIG. 12 is a schematic plan view of the lighting unit of this invention. This lighting unit controls brightness for each of a plurality of divided block areas independently. For example, as illustrated in FIG. 12, let us consider the surface of the light guide plate 10 that is divided vertically into four segments (A1-A4) and horizontally into five segments (B1-B5). By properly selecting from among the light sources making up a light source group the ones to be turned on, the brightness can be controlled for each block area independently. If, for example, only a block area A3-B1 is to be turned on, since the light source group 21 illuminates the segment A3, as illustrated in FIG. 6 and FIG. 7, only those light sources in the light source group 21 which are located at a horizontal position corresponding to the segment B1 are turned on. The light emitted from the turned-on light sources enters into the light guide plate 10 and travels through the light mixing area 13. As described earlier, in this light mixing area 13, the light hardly leaves the light guide plate 10 from the front side, is mixed together and enhances the luminance uniformity as it travels. After the light has traveled past the light mixing area 13, in the light emitting area 14, a part of the light exits from the light guide plate 10 from its front side. The principal propagation direction in which the light leaves the light guide plate 10 is tilted away from the light source group 21 (in the figure, tilted toward right). So, the length 10 of the light emitting area 14 and the geometry of the back surface of the light emitting area 14 may be designed taking the thickness of the light guide plate into consideration so that the light traveling towards the front side of the lighting unit through the optical path changer 30 from one-half of the light emitting area 14 on the far side from the light source group 21 becomes brighter than the other half when observed from the front side. Most of the light that has traveled past the light emitting area 14, leaves the light guide plate from its front side in the light mixing area 15.

To divide the light guide plate into a plurality of segments in the longitudinal direction of the light source group, a fine groove 10g extending perpendicular to the longitudinal direction of the light source group may be provided, as necessary, as described earlier. In this case, the fine groove 10g can prevent the light from spreading in the longitudinal direction of the light source group into other areas than the targeted block area.

As described above, when it is desired to illuminate the block area A3-B1 of the lighting unit, the light sources assigned to this area, i.e., those of the light sources making up the light source group 21 which correspond to the segment B1 need to be turned on.

In other words, the lighting unit of this invention assigns predetermined light sources to each block area and controls the on/off operation of the assigned light sources to control the brightness of each block area.

When viewed from another perspective, the lighting unit of this invention, which has a light guide plate with grooves each accommodating a light source group, is provided with light mixing areas adjoining the grooves, wherein each light mixing area satisfies a relation of L01<L02 where L01 is the quantity of light traveling away from a groove adjoining the light mixing area and leaving the light guide plate from a block area of its front surface and L02 is the quantity of light traveling towards a groove adjoining the light mixing area and leaving the light guide plate from a block area of its front surface. In other words, as illustrated in FIG. 6, the quantity L01 of light emitted from the light source group 21 and leaving the light mixing area 13 adjoining the light source group 21 through the front side of the light guide plate, is smaller than the quantity L02 of light leaving the light mixing area 15—which is located remote from the light source group 21—through the front side of the light guide plate.

For improved controllability of brightness level in each block area of the lighting unit and for improved image quality of a display, the difference between L01 and L02 is preferably large. L02 is desirably more than five times larger than L01. In a high quality display that preferably has a screen contrast ratio of several tens of thousands to one, it is desired that the lighting unit has L02 equal to or more than 10 times L01, considering the display panel of contrast ratio several thousands.

Figure 13:
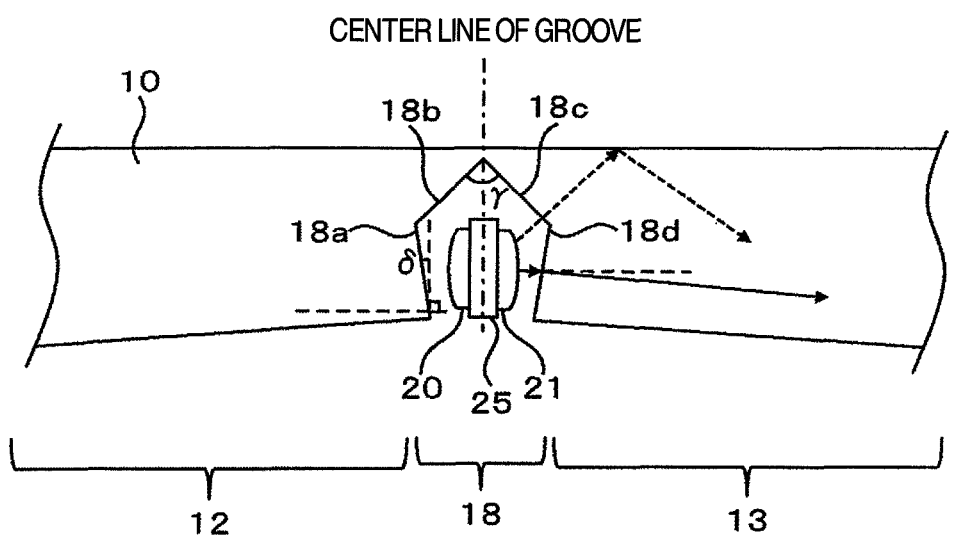
FIG. 13 is a schematic cross-sectional view showing another groove in the light guide plate of the lighting unit and neighborhood of the groove according to one embodiment of this invention.

Next, a modified example of the cross-sectional shape of the grooves in the light guide plate will be explained. FIG. 13 is a schematic cross section of a groove in the light guide plate. This embodiment has the planes defining the groove changed in angle from those of the preceding embodiment described with reference to FIG. 11. So, portions identical with the corresponding ones of the preceding embodiment are given the same reference numerals and their explanations except for the modified portions will be omitted.

In this embodiment the groove 18 in the light guide plate has planes 18a and 18d, inclined by an angle δ from a line normal to the front surface of the light guide plate 10, and two planes 18b and 18c forming an apex angle γ. The reason that the groove has two planes forming the apex angle γ is that, after being emitted from light sources making up the light source groups 20 and 21, the light traveling toward the front surface of the light guide plate 10 (indicated with a dashed line in the figure) can be prevented by these two planes from directly exiting from the front surface of the light guide plate, making the area close to where the light sources are accommodated brighter than other areas, and degrading the luminance uniformity. The apex angle γ needs to be properly designed by considering the angle distribution of light emitted from the light sources, as in the preceding embodiment. It is noted, however, that since a reduction in the apex angle γ results in the light guide plate being required to be increased in thickness, the apex angle γ should preferably be chosen from a range of 40-90 degrees.

The feature of this embodiment is that the planes 18a and 18d are inclined by an angle δ from the line normal to the front surface of the light guide plate 10. The directions of inclination of the planes 18a and 18d are such that the upper parts of these planes are more distanced from a center line of the groove 18 than their lower parts (on the far side from the object to be illuminated).

That is, the groove 18 in the light guide plate 10 that accommodates the light source groups 20 and 21 is defined by a pair of planes 18a and 18d so arranged that they progressively move away from each other towards the front surface of the light guide plate 10 and a pair of surfaces 18b and 18c so arranged that they progressively move closer to each other towards the front surface of the light guide plate 10. In other words, the distance between the plane 18a and the plane 18d increases towards the front surface of the light guide plate 10 while the distance between the plane 18b and the plane 18c decreases towards the surface of the light guide plate 10.

Here, suppose that LEDs are used as light sources. If no particular modification is made, light emitted from the light sources has the largest light intensity in a direction parallel to the front surface of the light guide plate 10. So, if the planes 18a and 18d defining the groove 18 are parallel to the line normal to the front surface of the light guide plate 10, a part of the light emitted from the light source groups 20 and 21 through the adjoining groove into the light guide plate 10 directly reaches another groove opposing the groove from which the light has originated. The light reaching the opposing groove may cause light losses of innegligible magnitude particularly when the distance between the grooves are short.

To cope with this problem, this embodiment works as follows. When the light emitted from, for example, the light source group 21, propagates in a direction parallel to the front surface of the light guide plate 10 and enters into the light guide plate 10 through the plane 18d, it is refracted toward the lower part of the light guide plate 10. So, the light entering into the light guide plate 10 through the plane 18d of the groove 18 is less likely to directly reach the opposing groove 19, resulting in an improved utilization of the emitted light.

The inclination angle δ of the planes defining the groove 18 needs to be properly determined by considering the distance between the grooves in the light guide plate, the thickness of the light guide plate and the orientation characteristics of light emitted from the light sources. It is noted, however, that too large an inclination angle δ may increase unwanted reflections on an incidence plane and also the width of the groove, giving rise to a problem of brightness non-uniformity. It is therefore realistic that the inclination angle δ is equal to or less than 30 degrees and more preferably less than 15 degrees. That is, when the planes defining the groove are inclined, the inclination angle δ should be set in a practical range of $0°<δ<15°$.

Figure 14:
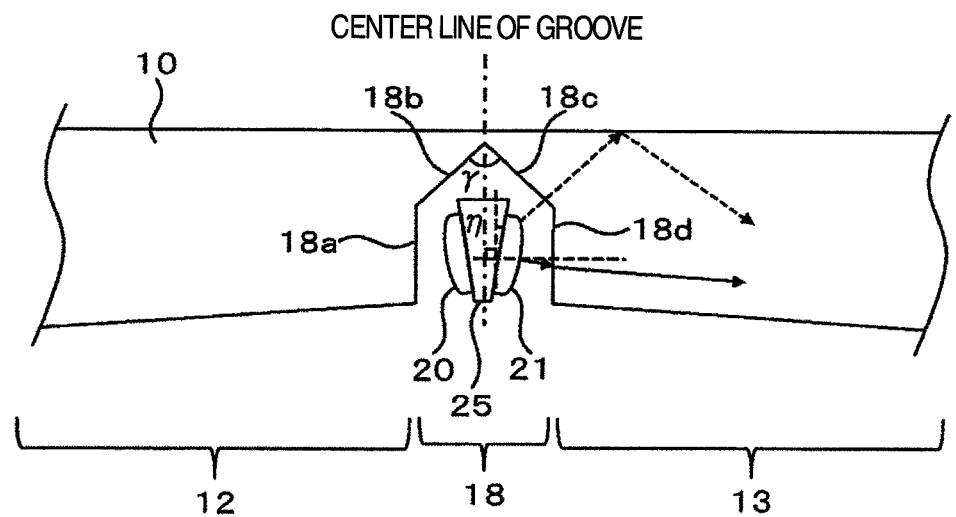
FIG. 14 is a schematic cross-sectional view showing a yet another groove in the light guide plate of the lighting unit and neighborhood of the groove according to one embodiment of this invention.

Next, another modified example of the light source group will be explained. FIG. 14 is a schematic cross section of light source groups in a groove in the light guide plate and neighborhood of the groove. In this embodiment, the mounting angle of the light sources making up the light source groups is different from that of the preceding embodiment explained with reference to FIG. 11. So, portions identical with the corresponding ones in the preceding embodiment are given the same reference numerals and their explanations except for the modified portions are omitted.

In this embodiment, the light sources making up the light source groups are fixed at an angle η to a line normal to the front surface of the light guide plate. The directions at the angle η of inclination of the light source groups 20 and 21 are such that the upper parts of the light sources are more distanced from a center line of the groove than their lower parts (on the far side from the object to be illuminated).

In this case, the quantity of light emitted from the light source groups 20 and 21 becomes greater in a direction inclined from a direction parallel to the front surface of the light guide plate 10 toward the back side of the light guide plate 10. That is, the amount of light emitted from the light source groups 20 and 21 becomes maximum in a direction inclined from a direction parallel to the flat-plate-like plane of the light guide plate 10 toward the back surface of the plate. So, the principal propagation direction of light emitted from, for example, the light source group 21 into the light guide plate (i.e., the direction in which the light intensity is greatest) is a direction inclined from a direction parallel to the front surface of the light guide plate 10 toward the back side of the plate. In this case, the light entering from the plane 18d of the groove 18 is less likely to directly reach the opposing groove 19, improving a utilization efficiency of the emitted light.

The mounting angle η of light sources making up the light source groups 20 and 21 needs to be properly determined by considering the size and the orientation characteristics of the light sources, the distance between the grooves in the light guide plate and the thickness of the light guide plate, etc. It is noted, however, that too large an angle η can increase unwanted reflections on an incidence plane and a space occupied by the light source groups, making the accommodation of the light source groups difficult. It is therefore realistic that the angle η is equal to or less than 30 degrees and more preferably less than 15 degrees. That is, the mounting angle η of the light sources making up the light source groups 20 and 21 should be set in a practical range of $0°≦η<15°$.

The essence of this embodiment is that the principal propagation direction of light emitted from a light source group is inclined from a direction parallel to the front surface of the light guide plate toward the back side of the light guide plate. So, instead of the mounting angle of the light sources as in this embodiment, some modification may be made to the structures of the lens of the light sources and of the reflectors. In either case, to minimize unwanted reflections on the incidence plane, it is desired that the principal propagation direction of light emitted from the light source group be inclined 0-15 degrees from the direction parallel to the front surface of the light guide plate toward the back side of the plate.

Figure 15:
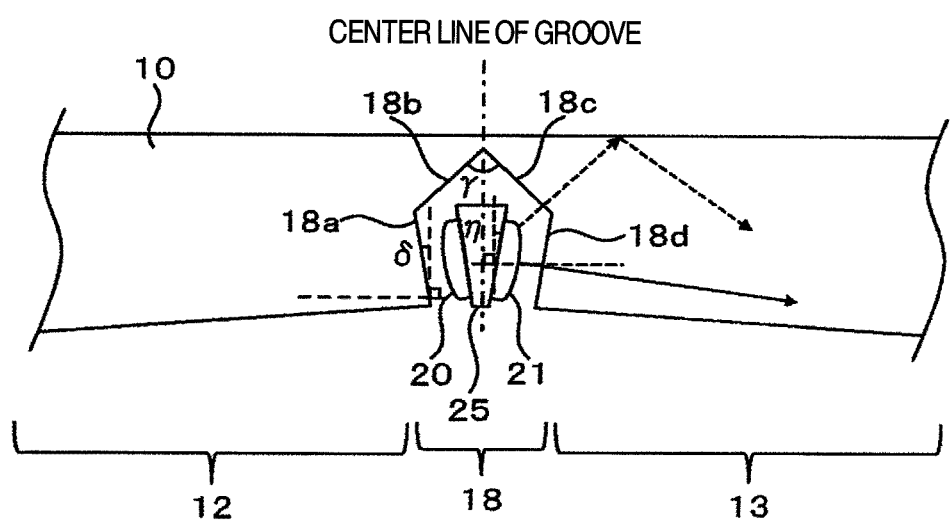
FIG. 15 is a schematic cross-sectional view showing a further groove in the light guide plate of the lighting unit and neighborhood of the groove according to one embodiment of this invention.

Next, a further modified example of the light source groups and the grooves of the light guide plate will be explained. FIG. 15 is a schematic cross section showing light source groups in a groove in the light guide plate and neighborhood of the groove. This embodiment is a combination of the preceding embodiments explained with reference to FIG. 13 and FIG. 14. In this example, the planes defining the groove are inclined and the mounting angle of the light sources of the light source groups is changed. So, portions identical to the corresponding ones in the preceding embodiments are given the same reference numerals and their explanations except for the modified portions are omitted.

In this embodiment, the planes 18a and 18d defining the groove 18 are inclined by an angle δ from a line normal to the front surface of the light guide plate 10, and the light sources making up the light source groups 20 and 21 are fixed at an angle η with respect to a line normal to the front surface of the light guide plate. In this case, too, the principal propagation direction of light emitted, for example, from the light source group 21 into the light guide plate (i.e., the direction in which the light intensity is greatest) is a direction inclined from a direction parallel to the front surface of the light guide plate toward the back side of the plate, as in the preceding embodiments. So, the light entering from the plane 18d of the groove 18 is less likely to directly reach the opposing groove 19, improving a utilization efficiency of the emitted light.

In this embodiment, the inclination angle δ of the planes defining the groove and the mounting angle η of the light source are made close to each other or, more preferably, equal so that interface reflections on the incidence plane when the light emitted from the light sources enters into the light guide plate can be reduced, which in turn can stem light losses and realize a bright lighting unit.

Further, inclining the planes 18a and 18d defining the groove 18 increases a space inside the groove and therefore enhances the freedom degree for the shape of the light source groups 20 and 21 accommodated there. For example, a heat sink 25 of the light source groups 20 and 21 may be constructed such that its upper part (on the front side of the light guide plate) is wider than its lower part (on the back side of the plate), allowing the heat sink 25 to increase its capacity, thereby enhancing the heat dissipating capability.

The inclination angle δ of the planes 18a and 18d defining the groove 18 and the mounting angle η of the light sources making up the light source groups 20 and 21 need to be properly determined by considering the size and the orientation characteristics of the light sources, the distance between the grooves in the light guide plate and the thickness of the light guide plate, etc. It is noted, however, that when these angles δ and η become too large, the space occupied by the light source groups and the groove may increase, impairing the uniformity of illuminating light. It is therefore realistic that both of the angles δ and η are equal to or less than 30 degrees and more preferably less than 15 degrees. That is, they should be set in a practical range of $0° \leq δ, η < 15°$.

In this embodiment, too, the essence of the light source mounting angle is that the principal propagation direction of the light emitted from a light source group is inclined from a direction parallel to the front surface of the light guide plate toward the back side of the plate. So, instead of the mounting angle of the light sources as in this embodiment, some modification may be made to the structures of the lens of the light sources and of the reflectors. In either case, to minimize unwanted reflections on the incidence plane, it is desired that the principal propagation direction of light emitted from the light source group be inclined by 0-15 degrees from the direction parallel to the front surface of the light guide plate toward the back side of the plate.

Figure 16:
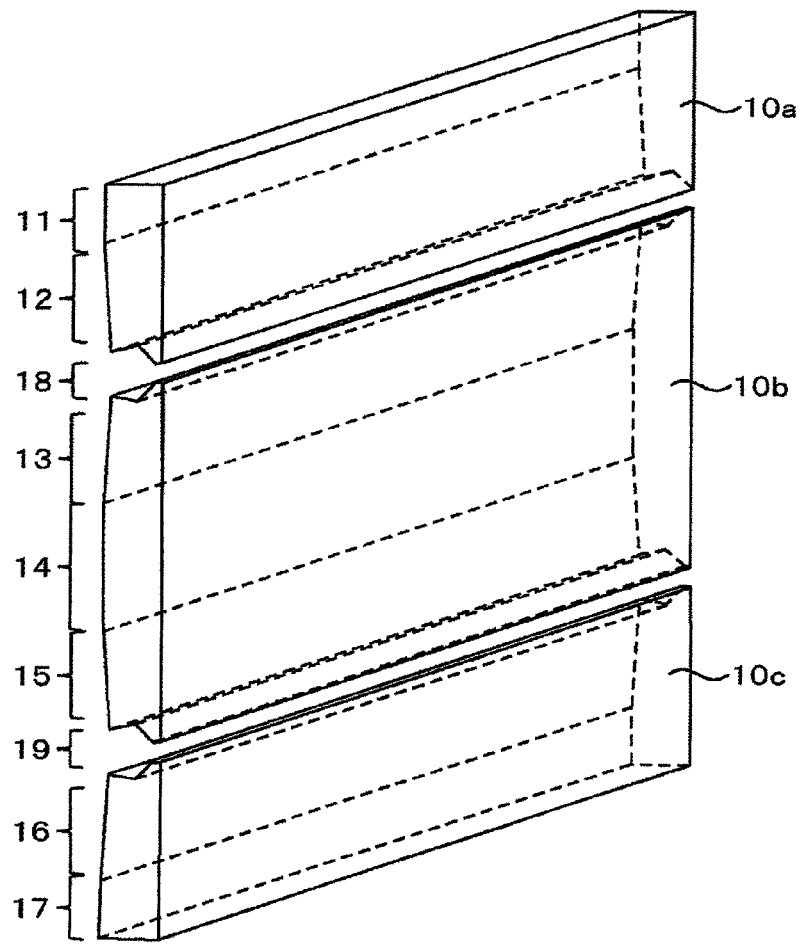
FIG. 16 is a schematic perspective view of a light guide plate used in the lighting unit according to one embodiment of this invention.

Next, a modified example of the light guide plate will be explained. FIG. 16 is a schematic perspective view of a light guide plate. This embodiment concerns a light guide plate divided into a plurality of parts (10a, 10b and 10c) at the grooves, with the basic structure and function identical to those of the preceding embodiments. So, portions identical with the corresponding ones in the preceding embodiments are given the same reference numerals and their explanations except for the modified portions are omitted.

In the receding embodiments, the light guide plate has been described to be a single member with a plurality of grooves formed therein. For example, in the light guide plate described with reference to FIG. 13 and FIG. 15, the width of the groove is wider at around the central portion of the light guide plate than at the lower portion. Such a shape is not easy to form by an ordinary injection molding. Further, at the groove portion the light guide plate is thin and mechanically weak. So, a deformation or breakage may initiate from this portion.

To deal with this problem, the light guide plate may be divided at the groove portions into a plurality of separate parts as in this embodiment, which are then assembled together to make the molding process easy and minimize possible deformation and breakage.

Parts of the light guide plate that contact with one another when assembled together may be secured with a bond or adhesive, or with a transparent elastic material such as a silicone rubber.

As described above, the lighting unit of this invention capable of controlling the luminance for each of a plurality of block areas can minimize luminance unevenness that would otherwise be caused by a plurality of light sources placed discretely. Because the light guide plate can employ parts divided at least at the grooves, its parts can be made small in number although the light guide plate can be preferably formed as a single member. Further, as for light source groups allocated for areas, two light source groups are accommodated in one groove. So, by allocating the two light source groups to a single heat sink, the two light source groups can be integrated as one. That is, the lighting unit capable of controlling the luminance in each of a plurality of block areas can be realized with a reduced number of parts of the light guide plate and of the light source groups.

(Embodiments of Display)

Figure 17:
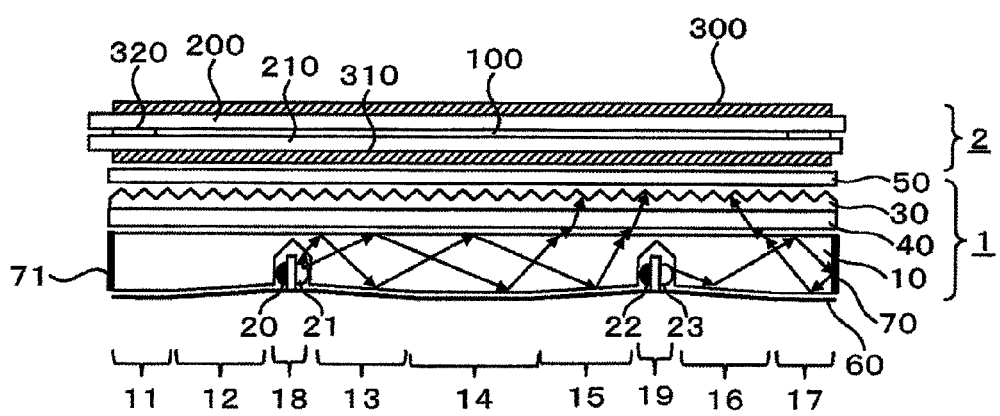
FIG. 17 is a schematic partial cross-sectional view of a display according to one embodiment of this invention.

Next, a display using the lighting unit of this invention will be described. FIG. 17 is a schematic cross section of the display of this invention. This display comprises a display panel 2 displaying an image by controlling a light transmission quantity according to image information, and a lighting unit 1 illuminating the display panel from its back.

The display can use a display panel that regulates the transmission quantity of incident light to display an image, especially a long lifed liquid crystal display panel capable of matrix display, A transmissive or semi-transmissive and reflective liquid crystal display panel can be used as the display panel 2 that, in combination with the lighting unit 1, displays an image by adjusting the transmission quantity of light from the lighting unit 1. The liquid crystal display panels are available in a passive matrix driving method or an active matrix driving method. Their detailed constructions and operations are well known and their explanations are omitted here.

The liquid crystal display panel with a polarizing plate, that displays an image by controlling a polarization state of light incident on a liquid crystal layer, is preferred because it can produce an image with high contrast ratio with a relatively low drive voltage. The liquid crystal display panel can use for example, TN (twisted nematic), STN (super twisted nematic), ECB (electrically controlled birefringence) modes. Further, IPS (in-plane switching) and VA (vertically aligned) modes can also be used, which are characterized in wide viewing angles.

Alternatively, the liquid crystal display panel can use a semi-transmissive reflective type that employs the aforementioned modes.

In the following, an active-matrix liquid crystal display panel will be outlined. It is noted, however, that this invention is not limited to it.

The display panel 2 has a first transparent substrate 200 and a second transparent substrate 210, which are flat and transparent and made of optically isotropic glass or plastics.

The first transparent substrate 200 is laminated with color filters and a polyimide alignment film (none of them shown). On the second transparent substrate 210, are formed matrix arrayed electrodes forming a plurality of pixels, signal electrodes, scanning electrodes, switching devices of thin-film transistors and an alignment film, etc. (none of them shown).

The two transparent substrates 200 and 210 have their alignment film-formed surfaces facing each other, with a spacer not shown interposed therebetween to keep them a predetermined distance apart and with their peripheral portions bonded together by a frame-like sealing material 320 to form an enclosed space in between. This space is filled with a liquid crystal and sealed to provide a liquid crystal layer 100.

The liquid crystal layer 100 has the orientation direction of its liquid crystal molecules' long axes defined by an aligning process done to the alignment films formed on the two transparent layers 200 and 210.

The first transparent substrate 200 is provided with a first optical film 300 on an observer side (front side) and the second transparent substrate 210 with a second optical film 310 on a side opposite the observer side (back side).

The first optical film 300 and the second optical film 310 have at least one polarization layer respectively and may also include an appropriate phase difference layer according to a liquid crystal display mode used. The polarization layer transmits one of two orthogonal linear polarization components of light incident on it and absorbs the other component. The polarization layer can be made, for example, by stretching a base film of polyvinyl alcohol dyed or adsorbed by a dichroic material such as iodine or organic dyes to orientate the dichroic material, which then exhibits an absorptive dichroism, and by sandwiching the orientated film between two transparent protective films such as triacetylcellulose films on both sides.

The film forming the second optical film 310 may include a reflective polarizing film that reflects a linear polarization component absorbed by the polarization layer but transmits other linear polarization components. In this case, the amount of light that is absorbed by the polarization layer reduces, resulting in producing a brighter image.

The first optical film 300 and the second optical film 310 are secured to the first transparent substrate 200 and the second transparent substrate 210, respectively, through an adhesive layer not shown.

In a region where the second transparent substrate 210 and the first transparent substrate 200 overlap, the display panel has a display area in which a two-dimensional image is formed by modulating the amount of transmitted light from the lighting unit 1. The first optical film 300 and the second optical film 310 have an area larger than the display area and are arranged to cover the entire display area, respectively.

As the lighting unit 1, the aforementioned lighting unit is used. The display panel 2 generally has a screen with an aspect ratio (vertical/horizontal ratio) of 3:4, 4:5 or 9:16 and is normally arranged so that its longitudinal direction aligns with the horizontal direction. It is therefore desired that the light source groups 20, 21, 22 and 23 constituting the lighting unit 1 be arranged so that the direction in which a plurality of light sources making up the light source groups are arrayed, i.e., the longitudinal direction of the light source groups, essentially matches the longitudinal direction of the screen of the display panel 2, i.e., the horizontal direction. It is also desired that the longitudinal direction of ridges of the prisms forming the prism-shaped surface of the optical path changer 30 be arranged to align virtually with the horizontal direction of the screen of the display panel 2.

With the above construction, the light emitted from the lighting unit 1 is concentrated in a direction normal to the screen of the unit. That is, the viewing angle in terms of luminance is narrower in the vertical direction of the screen than in its horizontal direction. This is instrumental in delivering a limited amount of light to an observer efficiently to meet the demand that the display in general have a wider viewing angle in a horizontal direction than in a vertical direction.

Figure 18:
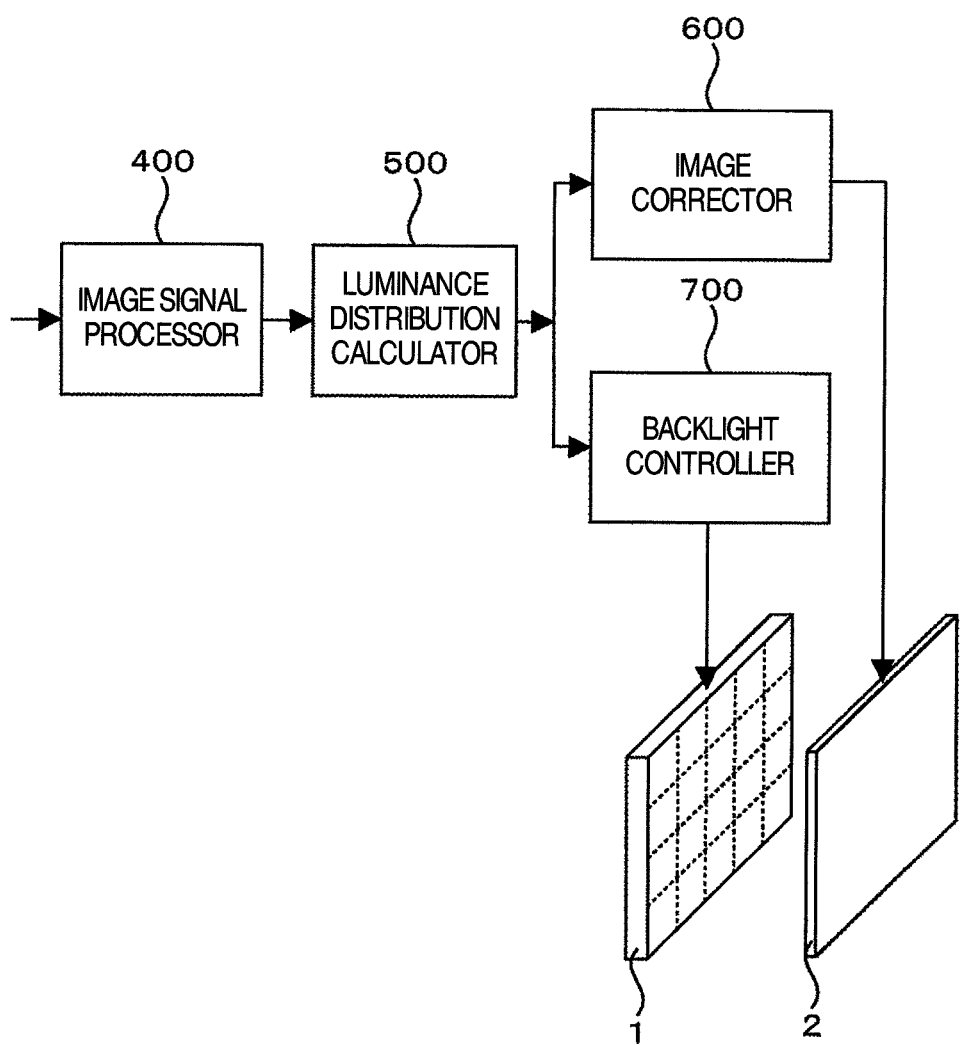
FIG. 18 is a schematic configuration diagram showing signal processor of the display of this invention.

FIG. 18 is a schematic configuration of the display of this invention, mainly showing a signal processing system. The lighting unit 1 and the display panel 2 are connected with a backlight controller 700 and an image corrector 600, respectively. The backlight controller 700 and the image corrector 600 are connected to a luminance distribution calculator 500, which in turn is connected to an image signal processor 400.

When an image signal is fed to the image signal processor 400, the image signal processor 400 generates a timing signal for image display and area control. Next, the luminance distribution calculator 500 performs an analysis on maximum and minimum values of the received original image signal for each block area. According to the result of this analysis, the brightness (backlight luminance level) in each area of the lighting unit is determined.

Next, the image corrector 600 corrects the image signal according to the determined backlight luminance level for each block area and, based on the corrected signal, drives the display panel 2. At the same time, the backlight controller 700 controls the lighting unit so that the brightness of each area of the lighting unit matches the corresponding backlight luminance level.

By controlling the brightness of the lighting unit (backlight) for each area in this manner according to the image to be displayed, a display can be realized which can produce a high quality image with a high contrast and a reduced power consumption. The lighting unit in the display of this invention, in particular, can minimize luminance unevenness that would otherwise be caused by a plurality of discretely arrayed light sources, has a slim bezel and a small thickness, and is able to control the brightness in each area. Therefore, a display with high luminance uniformity on the screen, a slim bezel, a small thickness and high quality images can be realized with a reduced number of parts.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A lighting unit comprising:
a light guide plate having a first groove and a second groove formed therein;
a first light source group accommodated in the first groove; and
a second light source group accommodated in the second groove;
wherein the light guide plate has a first light mixing area, a first light emitting area and a second light mixing area in that order from the first groove toward the second groove;
wherein, in the first light mixing area, the thickness of the light guide plate progressively increases away from the first light source group;
wherein, in the second light mixing area, the thickness of the light guide plate progressively increases away from the second light source group;
wherein, in the first light emitting area, the light guide plate is flat-plate-like; and
wherein the first light mixing area satisfies a relation L01<L02 where L01 is a quantity of light per block area of a front surface of the light guide plate, the light leaving the front side after being emitted from the first light source group and L02 is a quantity of light per block area of the front surface of the light guide plate, the light leaving the front side after being emitted from the second light source group.

2. A lighting unit according to claim 1, wherein a light reflector is provided at ends of the light guide plate;
wherein the light guide plate has a second light emitting area and a third light mixing area in that order from the ends of the light guide plate toward the first groove;
wherein, in the third light mixing area, the thickness of the light guide plate progressively increases away from the first light source group; and
wherein, in the second light emitting area, the light guide plate is flat-plate-like.

3. A lighting unit according to claim 1, wherein, in the first light mixing area, the light guide plate propagates light from the first light source group and causes light from the second light source group to leave the light guide plate from a front side thereof;
wherein, in the second light mixing area, the light guide plate propagates the light from the second light source group and causes the light from the first light source group to leave the light guide plate from the front side thereof; and
wherein, in the first light emitting area, the light guide plate causes the light from the first light source group and from the second light source group to leave the light guide plate from the front side thereof.

4. A lighting unit according to claim 1, wherein, in the first light mixing area and the second light mixing area, the cross section of the light guide plate is tapered;
wherein the cross section of the light guide plate in the first light mixing area and the cross section of the light guide plate in the second light mixing area are symmetrical with respect to a center line equidistant from the first groove and the second groove; and
wherein the cross sections of the light guide plate in the first light mixing area and in the second light mixing area are continuously connected to the cross section of the light guide plate in the first light emitting area.

5. A lighting unit according to claim 1, wherein, in the first light emitting area, a part of the light traveling from the first groove toward the second groove and a part of the light traveling from the second groove toward the first groove propagate and other parts of the light leaves the light guide plate from a front side thereof.

6. A lighting unit according to claim 1, wherein the first groove includes a first plane, a second plane, a third plane and a fourth plane;
wherein the first plane and the fourth plane of the first groove are normal to a flat-plate-like plane of the light guide plate; and
wherein the second plane and the third plane of the first groove are inclined to the flat-plate-like plane of the light guide plate.

7. A lighting unit according to claim 1, wherein the first groove is defined by a first plane, a second plane, a third plane and a fourth plane;
wherein a distance between the first plane and the fourth plane of the first groove progressively increases toward a front surface of the light guide plate; and
wherein a distance between the second plane and the third plane of the first groove progressively decreases toward the front surface of the light guide plate.

8. A lighting unit according to claim 1, wherein the first groove accommodates a third light source group and a heat sink; and
wherein the first light source group is arranged on one side of the heat sink and the third light source group is arranged on the other side of the heat sink.

9. A lighting unit according to claim 1, wherein the light guide plate has a light path changing member on a front side thereof; and
wherein the light path changing member changes directions of the light leaving the light guide plate from the front surface thereof.

10. A lighting unit according to claim 9, wherein the light path changing member is a transparent sheet;
wherein the light path changing member has a plurality of prism faces on a surface thereof; and
wherein ridges of the prism faces are parallel to a direction in which a plurality of light sources making up the first light source group are arrayed.

11. A lighting unit according to claim 1, wherein, in the first light mixing area and the second light mixing area of the light guide plate, a surface roughness Ra of a back surface of the light guide plate is greater than 0 nm and equal to or smaller than 38 nm.

12. A lighting unit according to claim 1, wherein a length Lm of the light guide plate in the first light mixing area satisfies an equation (1):

$$Lm \geq p/2 \tan \zeta 2 \geq p/2 \tan(\sin-1(n1/n2 \cdot \sin \zeta 1)) \qquad (1)$$

where p is a pitch at which a plurality of light sources making up the first light source group are arrayed, $\zeta 1$ is a half-value angle of an incident light emitted from the plurality of light sources into the light guide plate, and $\zeta 2$ is an angle at which the incident light on the light guide plate travels through the light guide plate, n1 is a refractive index of a medium between the light guide plate and the plurality of light sources, and n2 is a refractive index of the light guide plate.

13. A lighting unit comprising:
a light guide plate having a first groove and a second groove formed therein;
a first light source group accommodated in the first groove; and
a second light source group accommodated in the second groove;

wherein the light guide plate has a first light mixing area, a first light emitting area and a second light mixing area in that order from the first groove toward the second groove;

wherein, in the first light mixing area, the thickness of the light guide plate progressively increases away from the first light source group;

wherein, in the second light mixing area, the thickness of the light guide plate progressively increases away from the second light source group;

wherein, in the first light emitting area, the light guide plate is flat-plate-like;

wherein the first groove accommodates a third light source group and a heat sink;

wherein the first light source group is arranged on one side of the heat sink and the third light source group is arranged on the other side of the heat sink; and wherein a plurality of light sources making up the first light source group and a plurality of light sources making up the third light source group are staggered.

14. A lighting unit comprising:

a light guide plate having a first groove and a second groove formed therein;

a first light source group accommodated in the first groove; and a second light source group accommodated in the second groove;

wherein the light guide plate has a first light mixing area, a first light emitting area and a second light mixing area in that order from the first groove toward the second groove;

wherein, in the first light mixing area, the thickness of the light guide plate progressively increases away from the first light source group;

wherein, in the second light mixing area, the thickness of the light guide plate progressively increases away from the second light source group;

wherein, in the first light emitting area, the light guide plate is flat-plate-like; and wherein the quantity of light emitted from the first light source group is greatest in a direction parallel to a flat-plate-like plane of the light guide plate.

15. A lighting unit comprising:

a light guide plate having a first groove and a second groove formed therein;

a first light source group accommodated in the first groove; and a second light source group accommodated in the second groove;

wherein the light guide plate has a first light mixing area, a first light emitting area and a second light mixing area in that order from the first groove toward the second groove;

wherein, in the first light mixing area, the thickness of the light guide plate progressively increases away from the first light source group;

wherein, in the second light mixing area, the thickness of the light guide plate progressively increases away from the second light source group;

wherein, in the first light emitting area, the light guide plate is flat-plate-like; and wherein the quantity of light emitted from the first light source group is greatest in a direction inclined from a direction parallel to a flat-plate-like plane of the light guide plate toward a back side of the light guide plate.

16. A lighting unit comprising:

a light guide plate having a first groove and a second groove formed therein;

a first light source group accommodated in the first groove; and a second light source group accommodated in the second groove;

wherein the light guide plate has a first light mixing area, a first light emitting area and a second light mixing area in that order from the first groove toward the second groove;

wherein, in the first light mixing area, the thickness of the light guide plate progressively increases away from the first light source group;

wherein, in the second light mixing area, the thickness of the light guide plate progressively increases away from the second light source group;

wherein, in the first light emitting area, the light guide plate is flat-plate-like;

wherein, after being emitted from the first light source group, the light leaving the first light emitting area of the light guide plate from a front side thereof is greater in quantity than the light leaving the first light mixing area of the light guide plate from the front side thereof; and wherein, after being emitted from the second light source group, the light leaving the first light emitting area of the light guide plate from the front side thereof is greater in quantity than the light leaving the second light mixing area of the light guide plate from the front side thereof.

17. A lighting unit comprising:

a light guide plate having a first groove and a second groove formed therein;

a first light source group accommodated in the first groove;

a second light source group accommodated in the second groove;

a third light source group accommodated in the first groove; and a heat sink accommodated in the first groove;

wherein the light guide plate has a first light mixing area, a first light emitting area and a second light mixing area in that order from the first groove toward the second groove;

wherein, in the first light mixing area, the thickness of the light guide plate progressively increases away from the first light source group;

wherein, in the second light mixing area, the thickness of the light guide plate progressively increases away from the second light source group;

wherein, in the first light emitting area, the light guide plate is flat-plate-like; and wherein light sources constituting the first light source group and light sources constituting the third light source group are alternatively disposed in a single line on one side of the heat sink, and a direction of light emitted from the first light source group is opposite to a direction of light emitted from the third light source group.

* * * * *